US012305440B1

(12) United States Patent
Yang et al.

(10) Patent No.: US 12,305,440 B1
(45) Date of Patent: May 20, 2025

(54) SINGLE MOTOR-DRIVEN DOUBLE PUSH ROD ELECTRIC VEHICLE TAILGATE SYSTEM

(71) Applicant: NINGBO POWERNICE INTELLIGENT TECHNOLOGY CO., LTD., Ningbo (CN)

(72) Inventors: Yong Yang, Ningbo (CN); Mengliang Wei, Ningbo (CN); Peng Lu, Ningbo (CN); Fernando Osca, Ningbo (CN)

(73) Assignee: NINGBO POWERNICE INTELLIGENT TECHNOLOGY CO., LTD., Ningbo (CN)

( * ) Notice: Subject to any disclaimer, the term of this patent is extended or adjusted under 35 U.S.C. 154(b) by 0 days.

(21) Appl. No.: 18/941,234

(22) Filed: Nov. 8, 2024

(30) Foreign Application Priority Data

Aug. 19, 2024 (CN) ......................... 202411135334.X
Aug. 19, 2024 (CN) ......................... 202422004441.0
Aug. 22, 2024 (CN) ......................... 202422040308.0
Aug. 22, 2024 (CN) ......................... 202422040310.8

(51) Int. Cl.
*E05F 15/00* (2015.01)
*E05F 15/603* (2015.01)

(52) U.S. Cl.
CPC ....... *E05F 15/603* (2015.01); *E05Y 2201/686* (2013.01); *E05Y 2201/71* (2013.01); *E05Y 2900/53* (2013.01)

(58) Field of Classification Search
CPC ....... E05F 15/00; E05F 15/603; E05F 15/605; E05F 15/611; E05F 15/614; E05Y 2201/686; E05Y 2201/706; E05Y 2201/726; E05Y 2201/71; E05Y 2201/72; E05Y 2900/53; E05Y 2900/544; E05Y 2900/546
See application file for complete search history.

(56) References Cited

U.S. PATENT DOCUMENTS 6,068,327 A * 5/2000 Junginger ............. E05F 1/1091 296/146.13
6,418,662 B2 * 7/2002 Weder ....................... G09F 3/10 47/72
6,454,341 B2 * 9/2002 Tolinski .................. B60J 5/104 296/106

(Continued)

*Primary Examiner* — Chi Q Nguyen
(74) *Attorney, Agent, or Firm* — Ming Jiang; OPENPTO US LLC

(57) ABSTRACT

An electric vehicle tailgate system includes a beam assembly fixed on a vehicle, a follow-up plate, a lifting arm, and a lifting power assembly. The lifting power assembly includes a motor, a first lifting push rod, a second lifting push rod, and a transmission mechanism coupled to the motor. The follow-up plate is hinged at its top end to the beam assembly, at its middle to the lower end of the lifting arm, and at its bottom end to the bottom end of either lifting push rod. The retractable ends of the lifting push rods are hinged to the middle-lower end of the lifting arm. The transmission mechanism includes at least one connecting shaft rotatably coupled to the motor, enabling synchronous extension and retraction of the lifting push rods. This configuration drives the lifting arm to open or close the tailgate efficiently, enhancing synchronization and reducing mechanical complexity.

20 Claims, 18 Drawing Sheets

(56) References Cited

U.S. PATENT DOCUMENTS

| | | | | |
|---|---|---|---|---|
| 7,963,580 | B2 * | 6/2011 | Plettrichs | B60R 5/047 296/96 |
| 11,448,002 | B2 * | 9/2022 | Lee | B60J 5/101 |
| 11,926,287 | B2 * | 3/2024 | Harmon | B62D 25/105 |
| 12,203,311 | B2 * | 1/2025 | Takaoka | E05F 15/605 |
| 2006/0137248 | A1 * | 6/2006 | Ichinose | E05F 15/611 49/342 |
| 2007/0132264 | A1 * | 6/2007 | Koneval | B62D 33/0273 296/57.1 |
| 2007/0245632 | A1 * | 10/2007 | Shimura | E05F 15/619 49/342 |
| 2019/0128323 | A1 * | 5/2019 | Scheuring | E05F 15/622 |
| 2019/0211604 | A1 * | 7/2019 | Scheuring | E05F 15/70 |
| 2024/0328230 | A1 * | 10/2024 | Osmialowski | E05F 1/10 |

* cited by examiner

SINGLE MOTOR-DRIVEN DOUBLE PUSH ROD ELECTRIC VEHICLE TAILGATE SYSTEM

CROSS-REFERENCES

This application claims priority to and the benefit of the following patent applications: Chinese patent application No. 202422040308.0, filed on Aug. 22, 2024, titled “A one-to-two car tailgate lifting power mechanism”, Chinese patent application No. 202422040310.8, filed on Aug. 22, 2024, titled “A coaxial automobile tailgate lifting structure”, Chinese patent application No. 202411135334.X, filed on Aug. 19, 2024, titled “An electric tailgate coupling push rod lifting structure”, and Chinese patent application No. 202422004441.0, filed on Aug. 19, 2024, titled “An electric tailgate coupling push rod lifting structure. The disclosures of these applications are incorporated herein by reference in their entirety.

TECHNICAL FIELD

The present invention relates to the technical field of automobile tailgates, specifically to a single motor-driven double push rod electric vehicle tailgate system.

BACKGROUND

As the logistics industry continues to develop, the demand for vehicles equipped with tailgates has been steadily increasing. Vehicle tailgates play a crucial role in facilitating the loading and unloading of goods, thereby enhancing efficiency and safety in transportation operations. Traditionally, most vehicle tailgates utilize hydraulic systems to perform lifting and lowering functions. However, these hydraulic systems present several challenges. They are often difficult to maintain and are prone to issues such as leaks, drips, and spills. Additionally, hydraulic systems can suffer from oil freezing at low temperatures, which hampers performance and reliability.

With growing environmental consciousness and the global trend toward “oil-to-electric” conversion, there is a significant shift toward using electric push rods to replace hydraulic push rods in mobile equipment. Electric push rods offer advantages in terms of environmental impact, energy efficiency, and ease of maintenance. However, electric vehicle tailgates have not been widely adopted due to high costs.

SUMMARY

The present invention provides a single motor-driven double push rod electric vehicle tailgate system designed to efficiently and synchronously open and close a vehicle’s tailgate. The system comprises a beam assembly fixed on the vehicle, a follow-up plate, a lifting arm, and a lifting power assembly. The lifting power assembly includes a motor, a first lifting push rod, a second lifting push rod, and a transmission mechanism coupled to the motor.

In this system, the top end of the follow-up plate is hinged to the beam assembly, while its middle portion is hinged to the lower end of the lifting arm. The bottom end of the follow-up plate is hinged to the bottom end of either the first or second lifting push rod. The retractable end of the first or second lifting push rod is hinged to the middle-lower end of the lifting arm. This configuration allows the lifting arm to move in a controlled and stable manner, enabling the tailgate to open or close smoothly along a predetermined path.

The transmission mechanism includes at least one connecting shaft rotatably coupled to the motor, enabling synchronous extension and retraction of the first and second lifting push rods along a certain direction. This synchronous movement drives the lifting arm effectively, ensuring high synchronization and consistency in the tailgate’s operation.

In one embodiment, the motor is fixed on the first lifting push rod, which is equipped with a first output shaft coupled to the motor. The transmission mechanism comprises a first connecting shaft, where one end is connected to the first output shaft and the other end is connected to a second output shaft provided on the second lifting push rod. This arrangement allows the motor to drive both lifting push rods simultaneously, ensuring they extend and retract synchronously without the need for separate motors or complex control systems.

In another embodiment, the motor is fixedly installed between the first and second lifting push rods. The transmission mechanism includes a first connecting shaft and a second connecting shaft. The first connecting shaft connects a first side of the motor to an input shaft on the first lifting push rod, while the second connecting shaft connects a second side of the motor to an input shaft on the second lifting push rod. This configuration ensures that both lifting push rods receive power directly from the motor, enhancing synchronization and reducing mechanical complexity.

The lifting power assembly may further include universal joint couplers connected between the lifting push rods and the connecting shafts. These universal joint couplers allow for angular misalignment and facilitate installation and disassembly, ensuring smooth operation even when there are dimensional and installation tolerances in the components. The couplers may feature elongated holes and hexagonal through-holes, enabling axial movement of the connecting shafts relative to the couplers. This design compensates for changes in distance between the lifting push rods during movement, eliminating axial forces within the lifting power assembly.

Each lifting push rod comprises an outer tube and an inner tube configured for telescopic movement, and a ball screw mechanism that converts rotational motion into linear motion. This mechanism allows the inner tube to extend or retract relative to the outer tube, driving the lifting arm and, consequently, the tailgate. The transmission gearbox within each push rod includes bevel gears and a gear train that provide speed reduction between the motor and the ball screw mechanism. This arrangement ensures efficient transmission of power and precise control over the tailgate’s movement.

The system is designed with reliability and safety in mind. The motor is equipped with a brake that locks the motor shaft when power is turned off, preventing unintended movement of the tailgate. The lifting push rods include a front end cap assembly with sealing rings and scraper rings to protect against dust and water ingress, enhancing durability. Bearings such as thrust bearings and angular contact bearings are used to bear compressive, tensile, and radial forces, improving reliability and reducing the need for additional components.

By utilizing a single motor to drive both lifting push rods, the invention reduces mechanical complexity, manufacturing costs, and control system requirements. The structural symmetry of the lifting push rods simplifies manufacturing and assembly, as adjustments can be made by changing only the installation positions of related components. This design also reduces the variety of materials needed, further decreasing costs.

The present invention addresses the challenges associated with existing hydraulic tailgate systems and electric tailgate systems that require multiple motors. It offers a cost-effective, reliable, and efficient solution for electric vehicle tailgate operations, promoting wider adoption of electric tailgates in vehicles. The system enhances synchronization between the lifting push rods, simplifies control mechanisms, and provides a robust structure capable of withstanding the demands of regular use.

DETAILED DESCRIPTION

These and other objects, features and advantages of the present disclosure will become better understood with the following preferred embodiments, accompanying drawings and description in detail.

Figure 1:
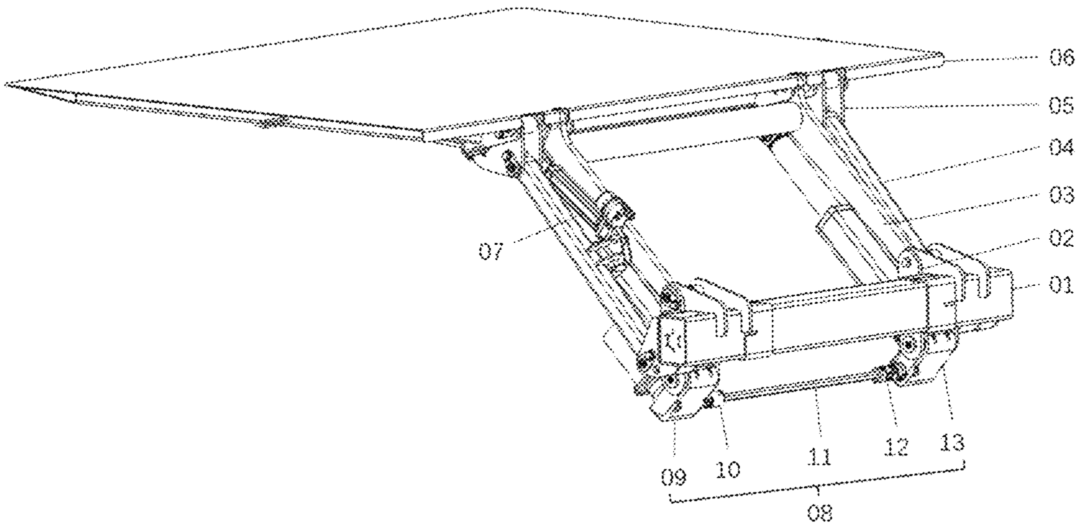
FIG. 1 is a perspective view of the single motor-driven double push rod electric vehicle tailgate system provided by the embodiment of the present invention.

An embodiment of the present application discloses a single motor-driven double push rod electric vehicle tailgate system. As shown in FIG. 1, the system includes: beam assembly (01), follow-up plate (02), lifting arm (03), fixed beam (04), support base (05), load platform (06), door closing push rod (07), and lifting power assembly (08).

The lifting power assembly (08) includes: first lifting push rod (09), first universal joint coupler (10), connecting shaft (11), second universal joint coupler (12), and second lifting push rod (13).

The top end of the follow-up plate (02) is hinged to the beam assembly (01), the middle of the follow-up plate (02) is hinged to the lower end of the lifting arm (03), and the bottom end of the follow-up plate (02) is hinged to the bottom end of either the first lifting push rod (09) or the second lifting push rod (13). The bottom end of the fixed beam (04) is hinged to the frame (01), and the retractable end of the first lifting push rod (09) or the second lifting push rod (13) is hinged to the middle-lower end of the lifting arm (03). The top end of the fixed beam (04) is hinged to the bottom end of the support base (05), and the top end of the lifting arm (04) is jointly hinged to the upper end of the support base (05) and the rear upper portion of the load platform (06). The lower rear end of the load platform (06) rests on top of the support base (05), and the bottom end of the door closing push rod (07) is hinged to the middle of one side of the fixed beam (04), while the retractable end of the door closing push rod (07) is hinged to the load platform (06).

Figure 2:
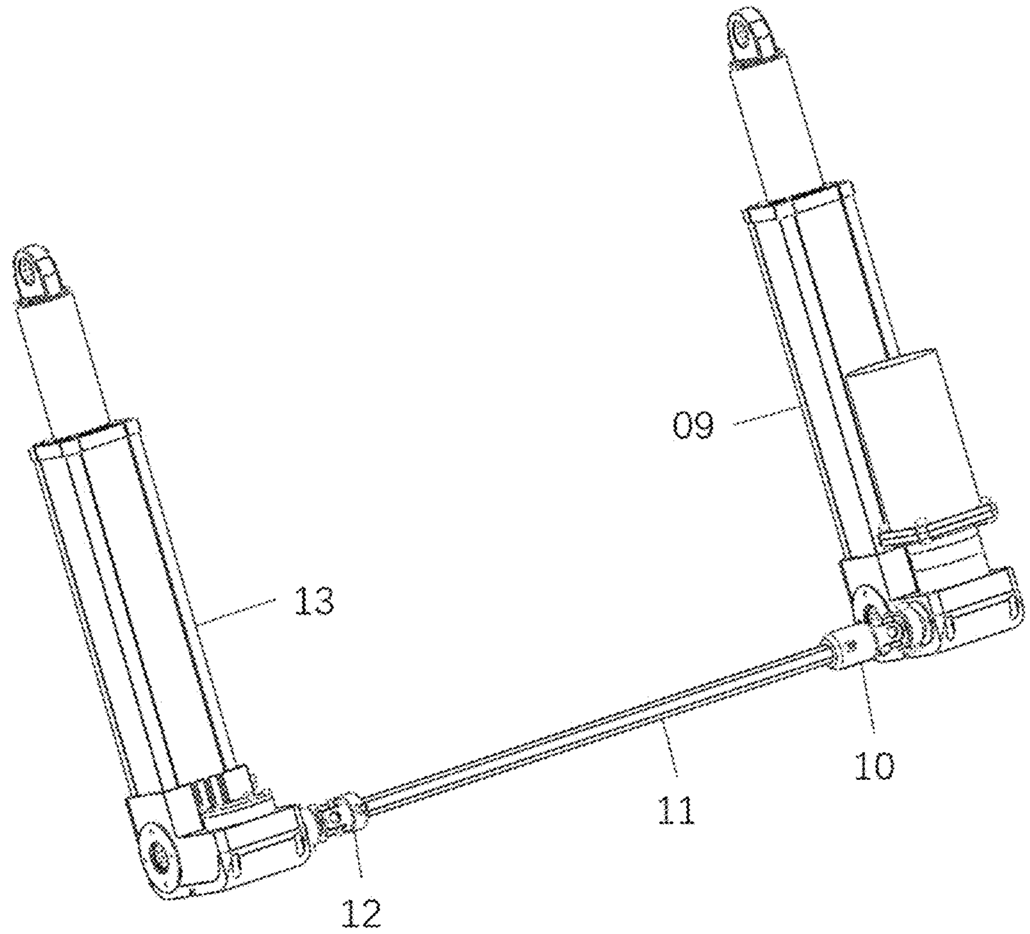
FIG. 2 is a schematic view of the lifting power assembly of the system.
Figure 3:
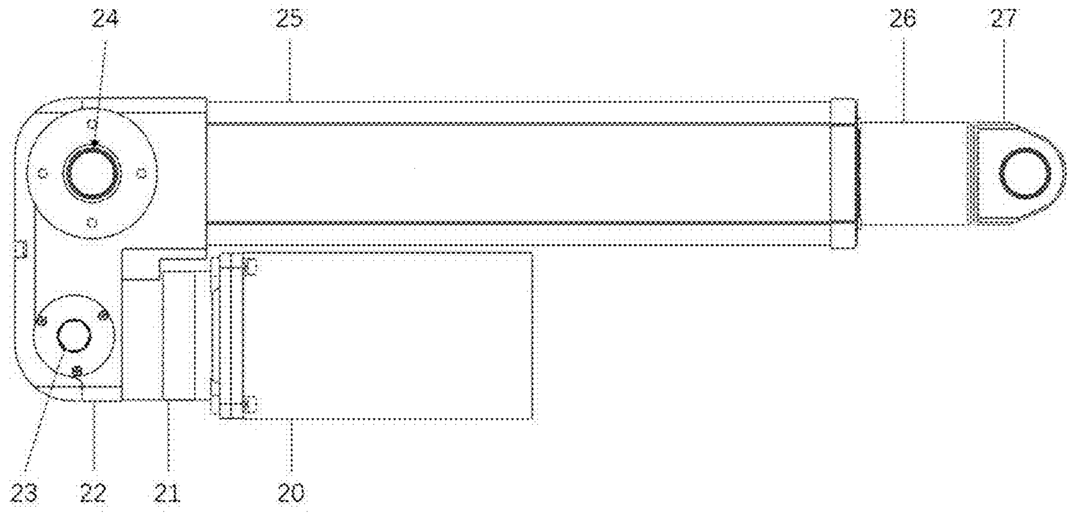
FIG. 3 is a structural schematic view of a first lifting push rod of the system.
Figure 4:
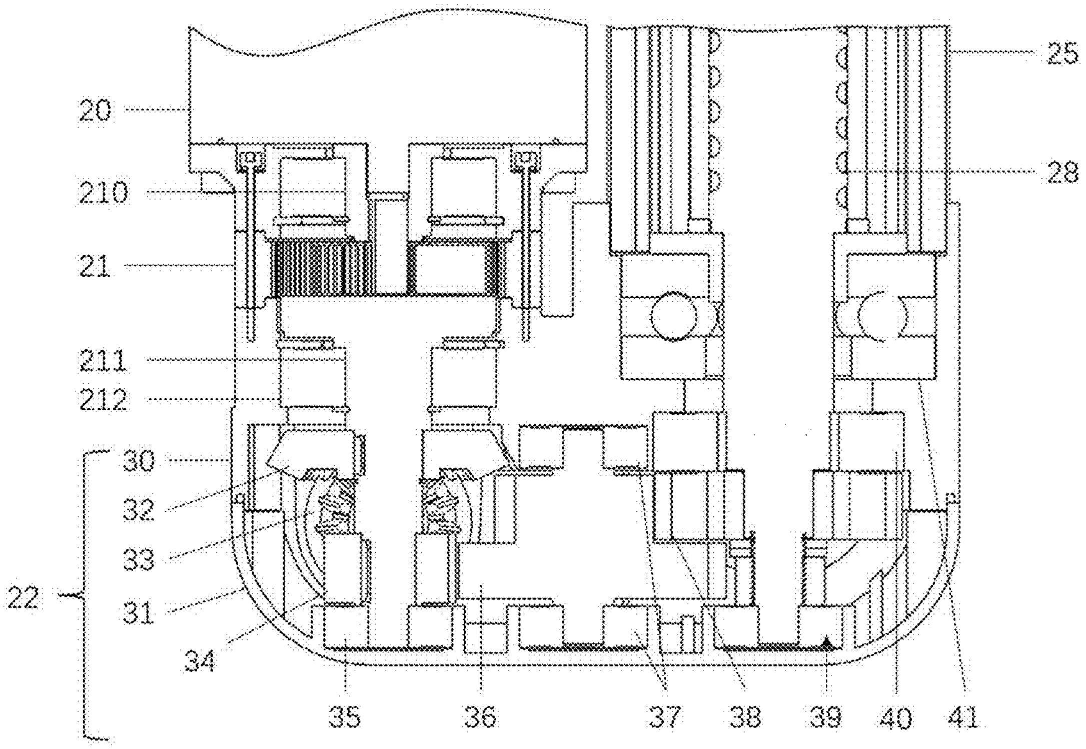
FIG. 4 is a cross-sectional view of the first lifting push rod.
Figure 5:
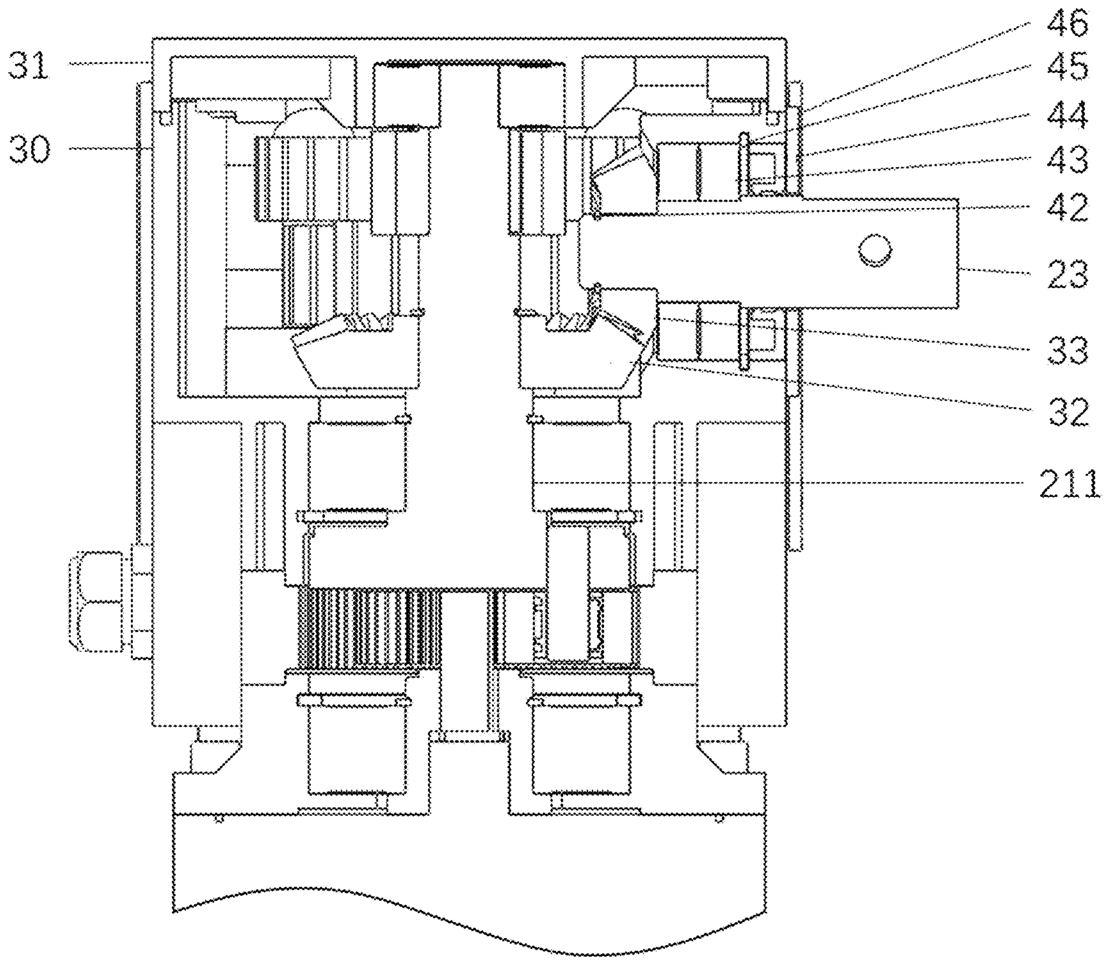
FIG. 5 is another cross-sectional view of the first lifting push rod.
Figure 6:
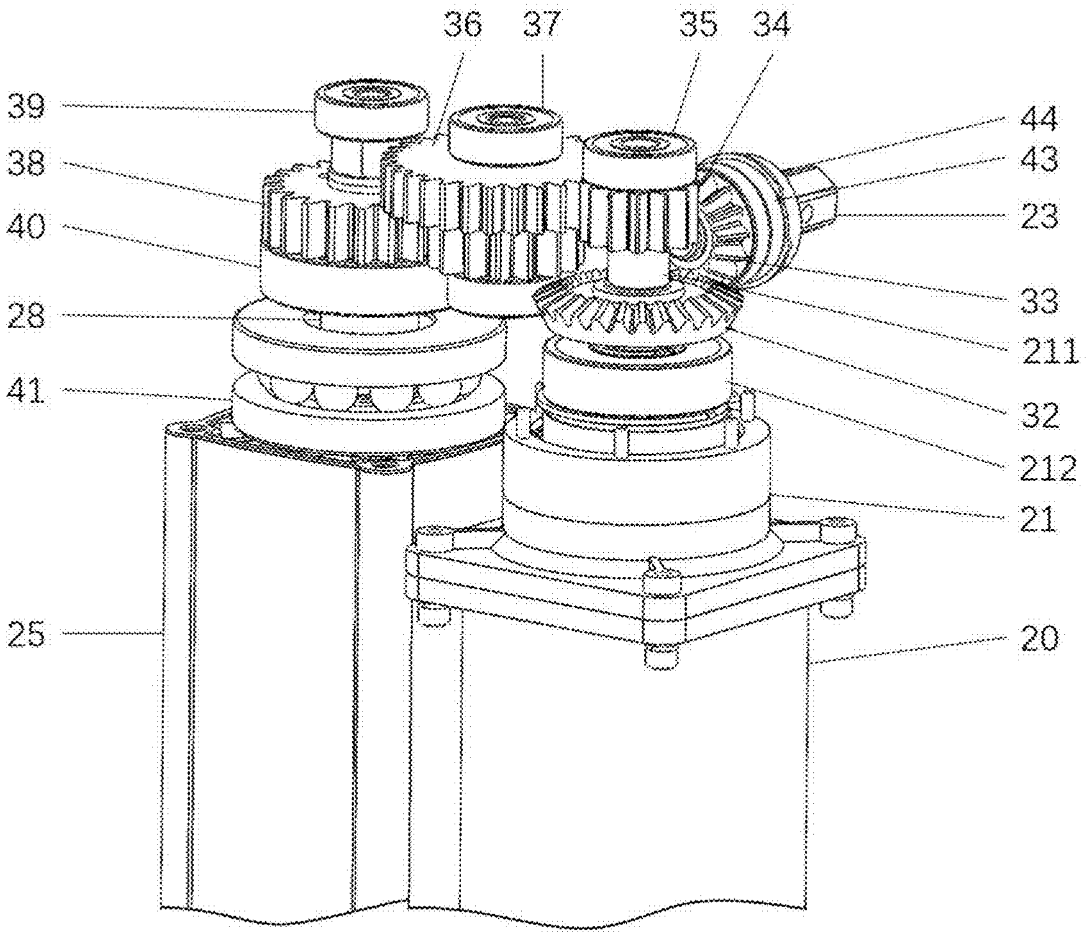
FIG. 6 is a schematic view of a transmission mechanism in of the first lifting push rod.

As shown in FIG. 2, the lifting power assembly (08) includes: first lifting push rod (09), first universal joint coupler (10), connecting shaft (11), second universal joint coupler (12), and second lifting push rod (13).

As shown in FIGS. 3-6, the first lifting push rod (09) includes: driving motor (20), planetary gearbox (21), transmission gearbox (22), output shaft (23), hinge hole (24), outer tube (25), inner tube (26), front joint (27), and ball screw (28). The driving motor (20) is equipped with a brake, which can lock the motor shaft when the power is turned off.

The planetary gearbox (21) includes: planetary input shaft (210), planetary output shaft (211), and first deep groove ball bearing (212). The shaft of the driving motor (20) is connected to the planetary input shaft (210), and the two cannot rotate relative to each other. The power is transmitted to the planetary output shaft (211) through the planetary reduction mechanism.

The transmission gearbox (22) includes: gearbox body (30), gearbox cover (31), driving bevel gear (32), output bevel gear (33), high-speed gear (34), second deep groove ball bearing (35), dual transmission gear (36), third deep groove ball bearing (37), low-speed gear (38), fourth deep groove ball bearing (39), fifth deep groove ball bearing (40), thrust bearing (41), shaft retaining ring (42), sixth deep groove ball bearing (43), oil seal (44), hole retaining ring (45), and end cover (46).

The planetary output shaft (211) is fixed and rotates on the first deep groove ball bearing (212) and the second deep groove ball bearing (35), allowing it to rotate around its own axis. The driving bevel gear (32) and high-speed gear (34) are fixedly connected to the planetary output shaft (211). The driving bevel gear (32) meshes with the output bevel gear (33). The high-speed gear (34) engages with the large gear of the dual transmission gear (36). The large gear of the dual transmission gear (36) engages with the small gear of the low-speed gear (38). The dual transmission gear (36) is rotationally fixed between two third deep groove ball bearings (37) and is also rotationally fixed between the gearbox body and the gearbox cover. The low-speed gear (38) is fixedly connected to the ball screw (28). The ball screw (28) is rotationally fixed to the gearbox body (30) and gearbox cover (31) through the fourth deep groove ball bearing (39) and fifth deep groove ball bearing (40).

The output shaft (23) is rotationally fixed to the gearbox body (30) by two sixth deep groove ball bearings (43). The output bevel gear (33) is fixedly connected to the output shaft (23), and at the front end of the output shaft (23), there is a shaft retaining ring (42) while the rear end of the sixth deep groove ball bearing (43) has a hole retaining ring (45). The oil seal (44) is fitted on the output shaft (23) between the hole retaining ring (45) and the end cover (46), preventing axial movement. The end cover (46) is fixedly connected to the gearbox body (30).

The first lifting push rod (09) transmits rotational power to the ball screw (28) through the driving motor (20), planetary reduction mechanism, and gear reduction mechanism. It also converts rotational motion into linear motion via the screw, pushing or pulling the inner tube (26) and front joint relative to the hinge hole outer tube (25).

On the other hand, the planetary reduction mechanism transmits the motion power to the output shaft (211) through the output bevel gear (33), allowing it to rotate about its axis.

Figure 7:
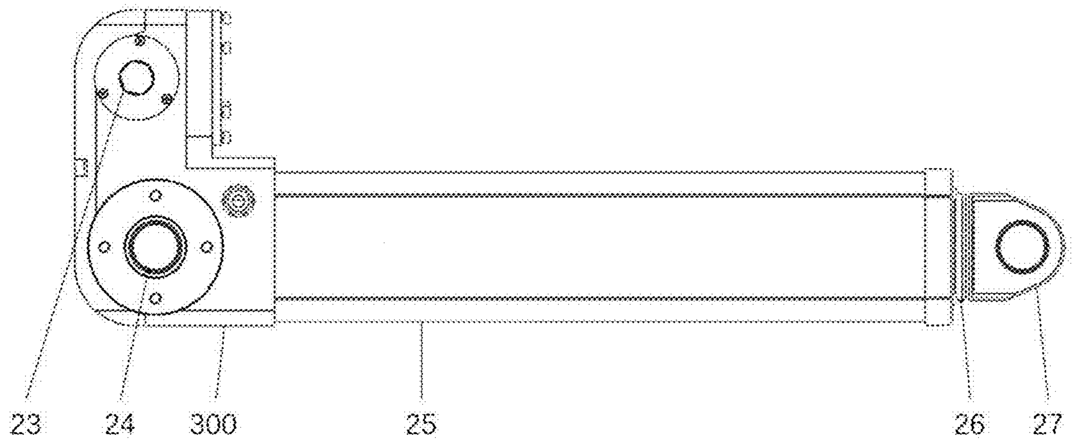
FIG. 7 is a schematic view of a second lifting push rod of the system.
Figure 8:
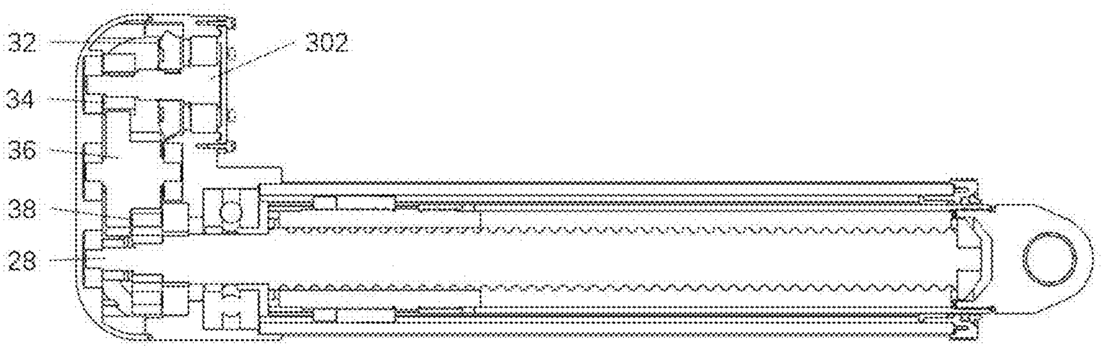
FIG. 8 is a cross-sectional view of the second lifting push rod.
Figure 9:
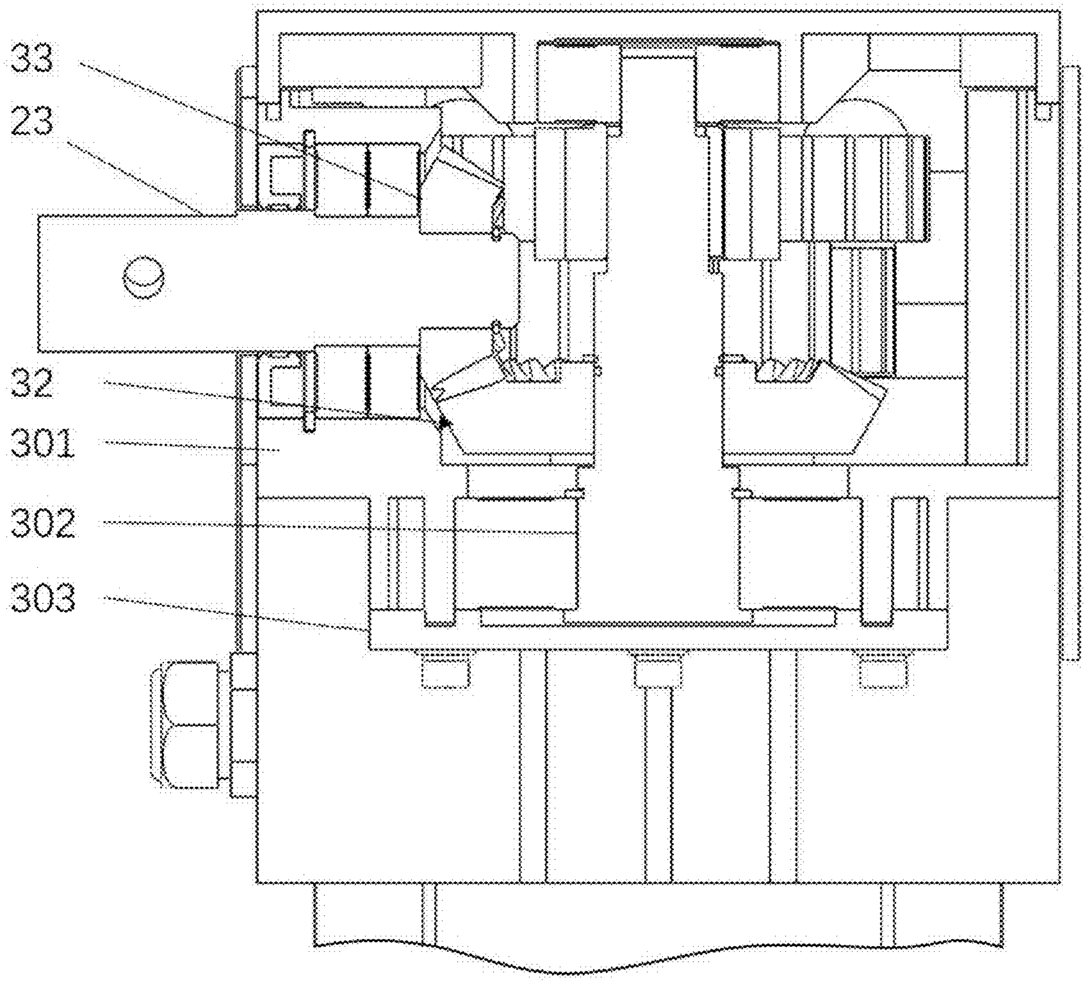
FIG. 9 is another cross-sectional view of the second lifting push rod.

As shown in FIGS. 7-9, The second lifting push rod (13) includes: transmission gearbox (300), output shaft (23), hinge hole (24), outer tube (25), inner tube (26), front joint (27), and ball screw (28). Its structure is similar to that of the first lifting push rod (09), and the arrangement of the output shaft (23) is symmetric to that of the first lifting push rod (09). Because the two pairs of reverse bevel gears change the direction of rotation, the rotation direction of the ball screw of the second lifting push rod (13) is opposite to the rotation direction of the ball screw of the first lifting push rod (09).

The transmission gearbox (300) includes: gearbox body (301), high-speed shaft (302), end cover (303), etc., with the remaining structure being the same as that of the first lifting push rod (09). The output shaft of the transmission gearbox (300) and the positions of other components are symmetrically arranged compared to the transmission gearbox (22) of the first lifting push rod (09).

In the second lifting push rod (13), the output shaft (23) serves as the power input source. The output shaft (23) converts rotational motion into the telescopic motion of the inner tube (26) and front joint (27) through bevel gears, two sets of gears, and the screw.

Figure 10:
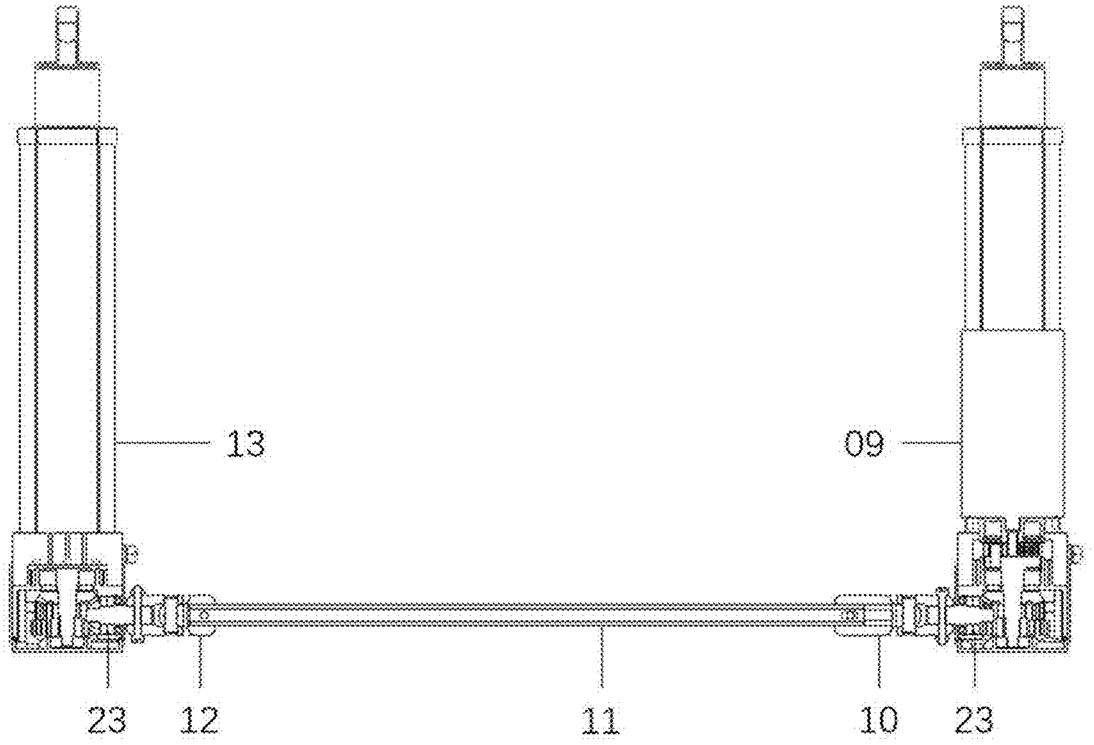
FIG. 10 is a schematic view of a transmission mechanism of the system.
Figure 11:
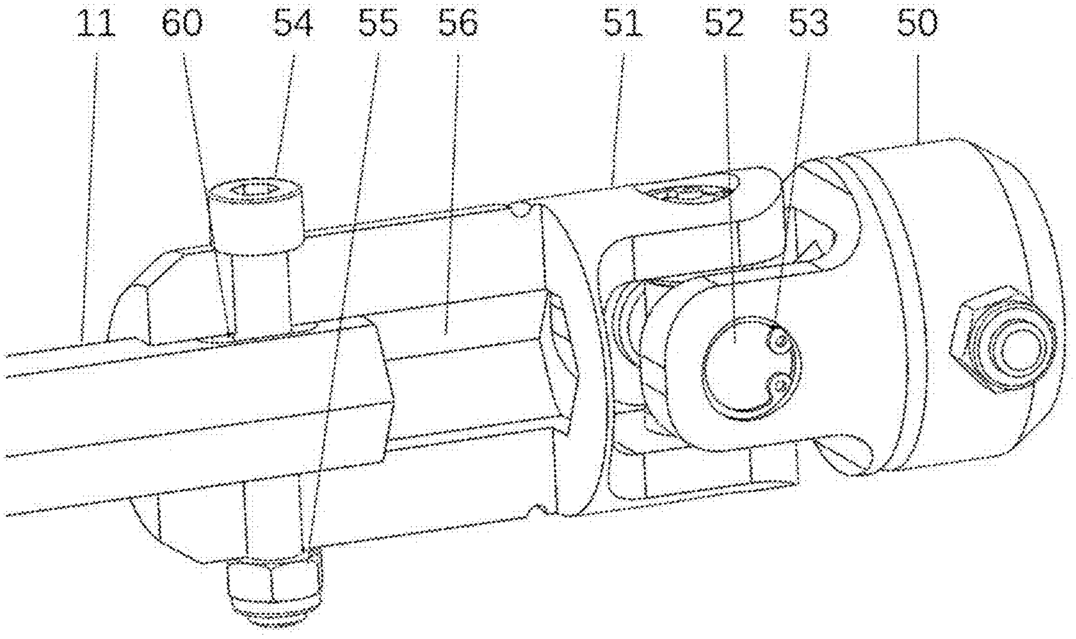
FIG. 11 is a schematic view of a first universal joint coupler.
Figure 12:
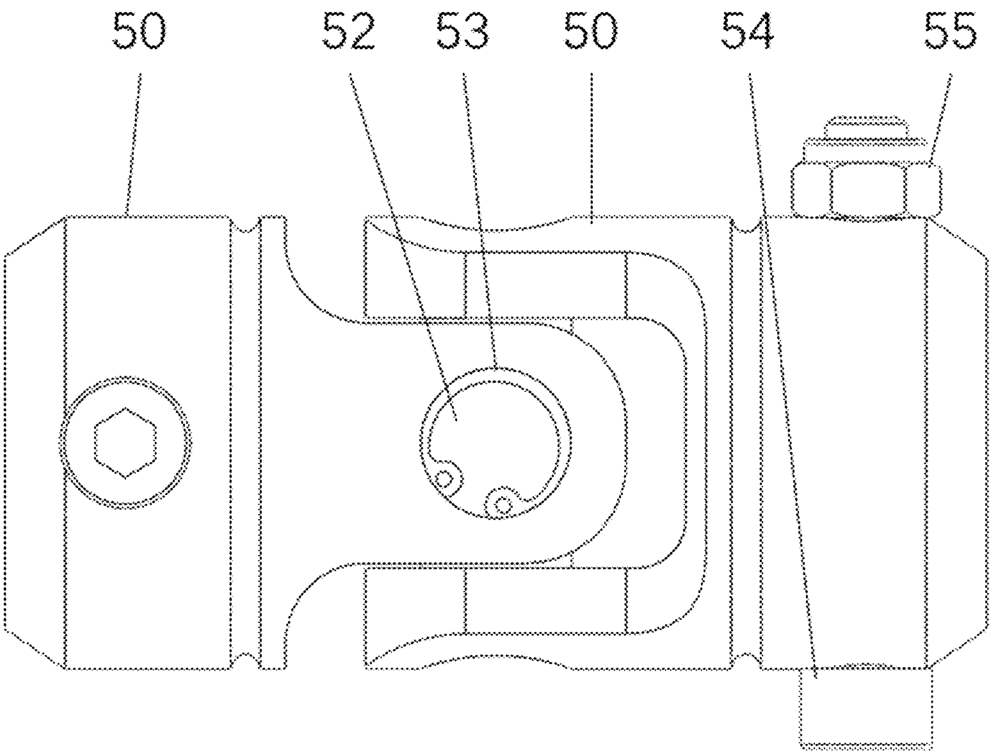
FIG. 12 is a schematic view of a second universal joint coupler.
Figure 13:
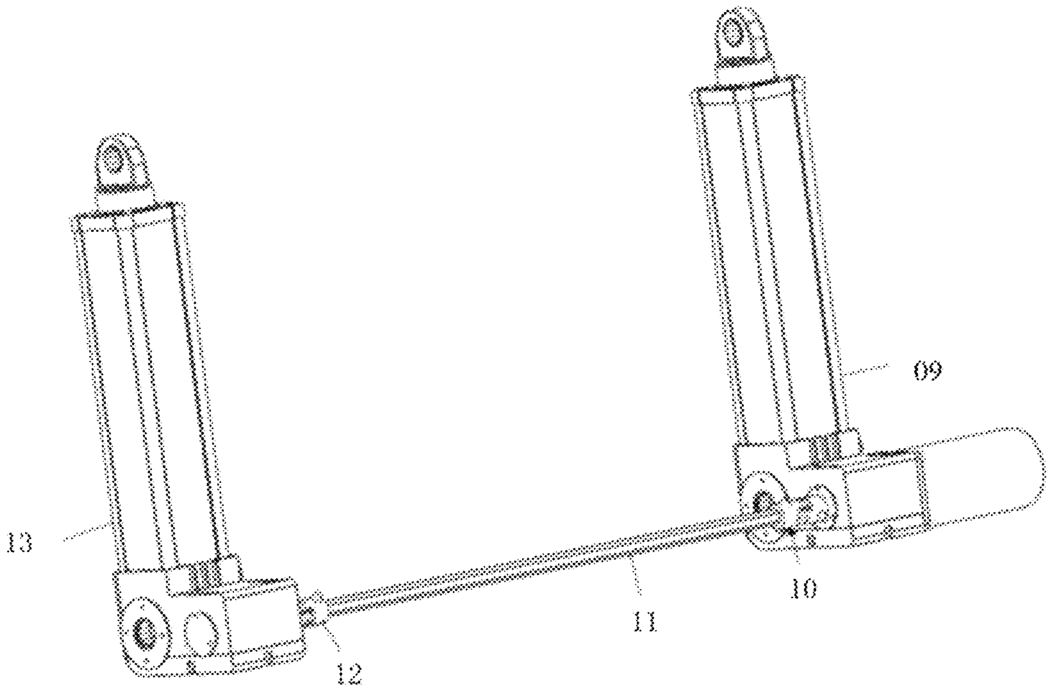
FIG. 13 is a schematic view of a lifting power assembly according to a second embodiment.
Figure 14:
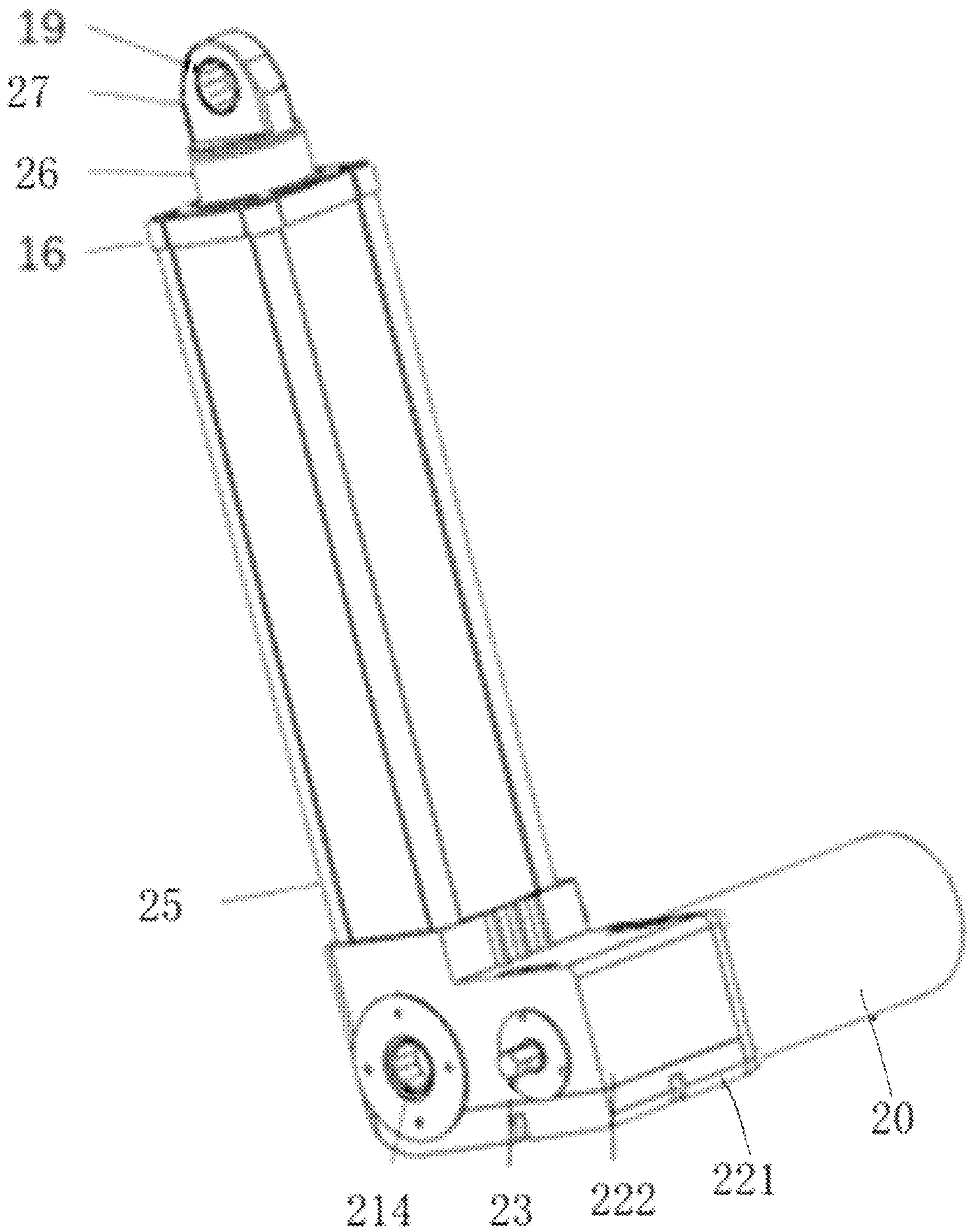
FIG. 14 is a schematic view of the first push rod of the second embodiment.
Figure 15:
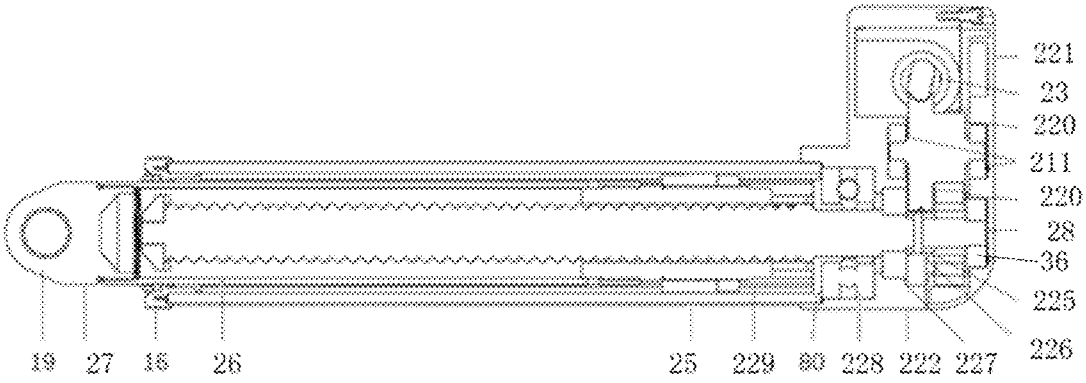
FIG. 15 is a cross-sectional view of the first push rod of FIG. 14.
Figure 16:
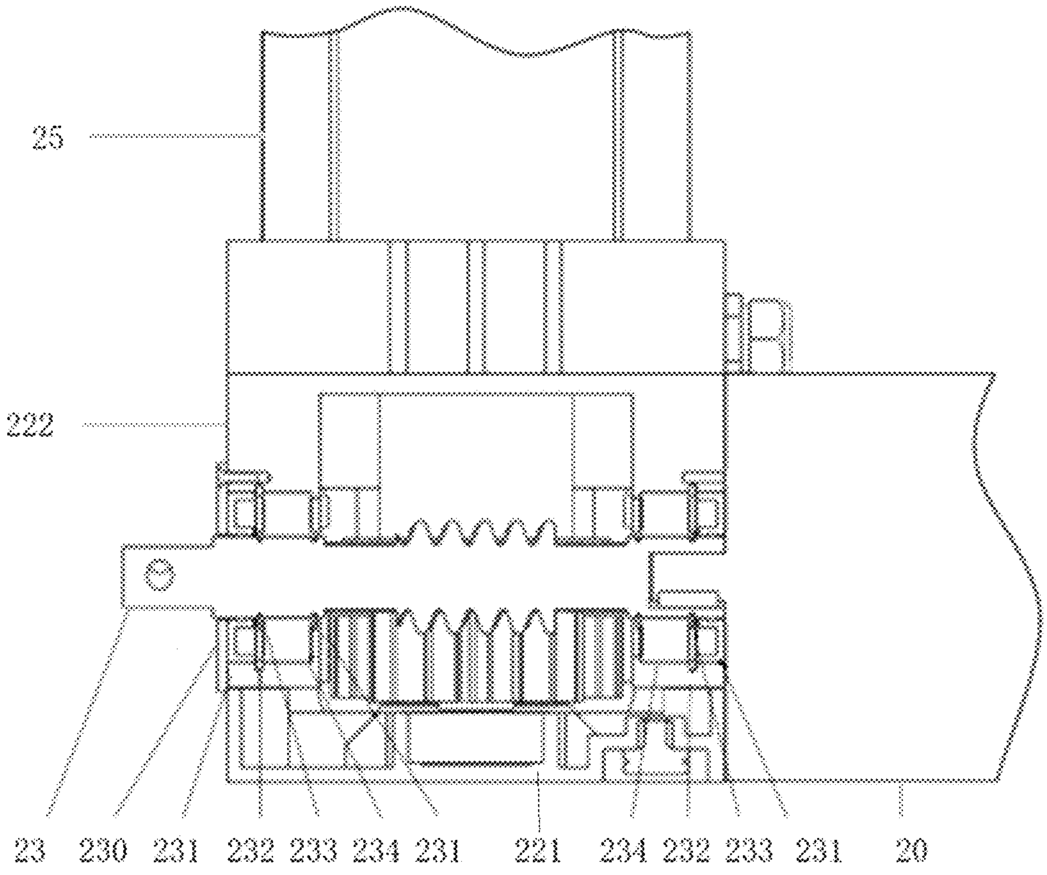
FIG. 16 is another cross-sectional view of the first push rod of FIG. 14.
Figure 17:
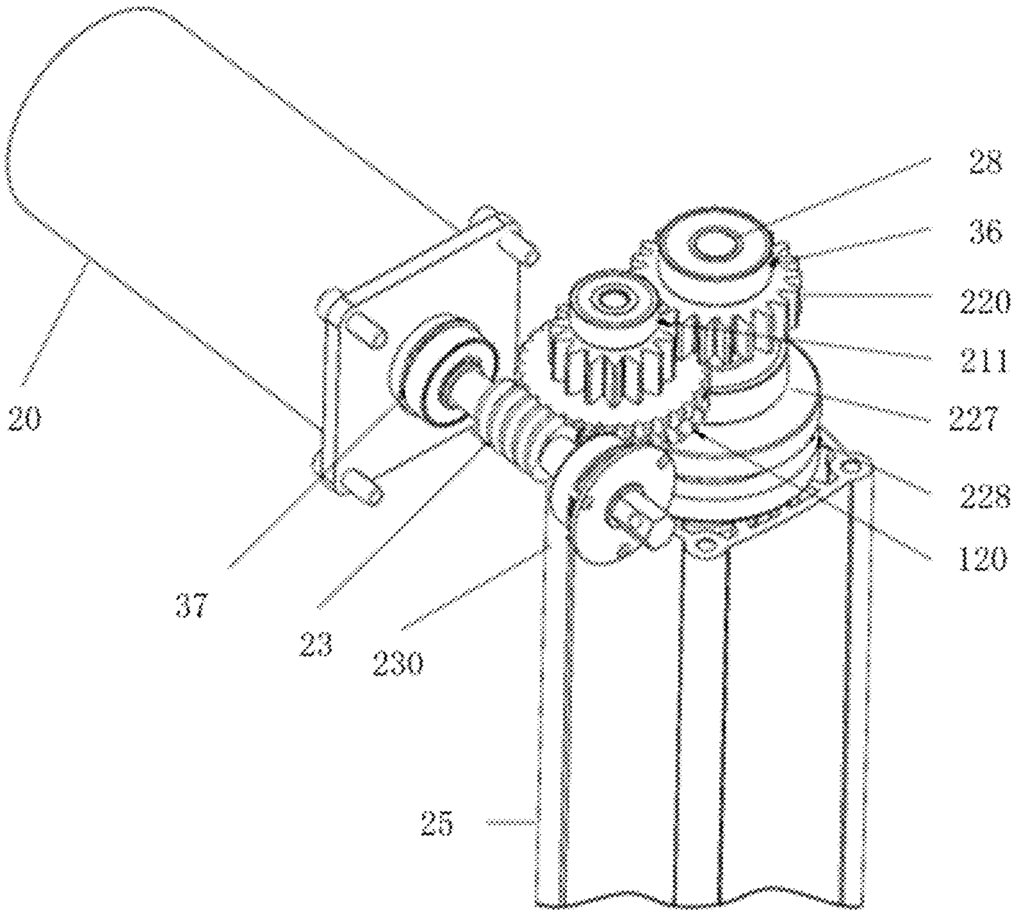
FIG. 17 is a schematic view of a transmission mechanism of the second embodiment.
Figure 18:
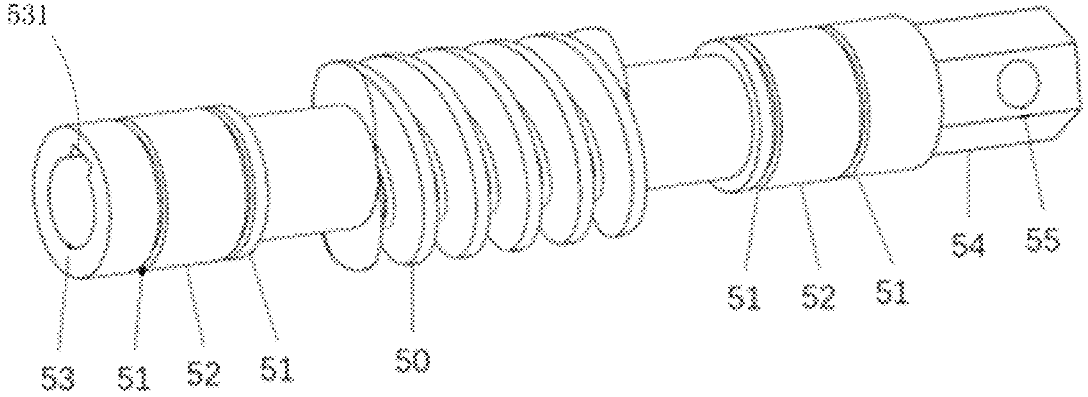
FIG. 18 is a schematic view of an output shaft of the second embodiment.
Figure 19:
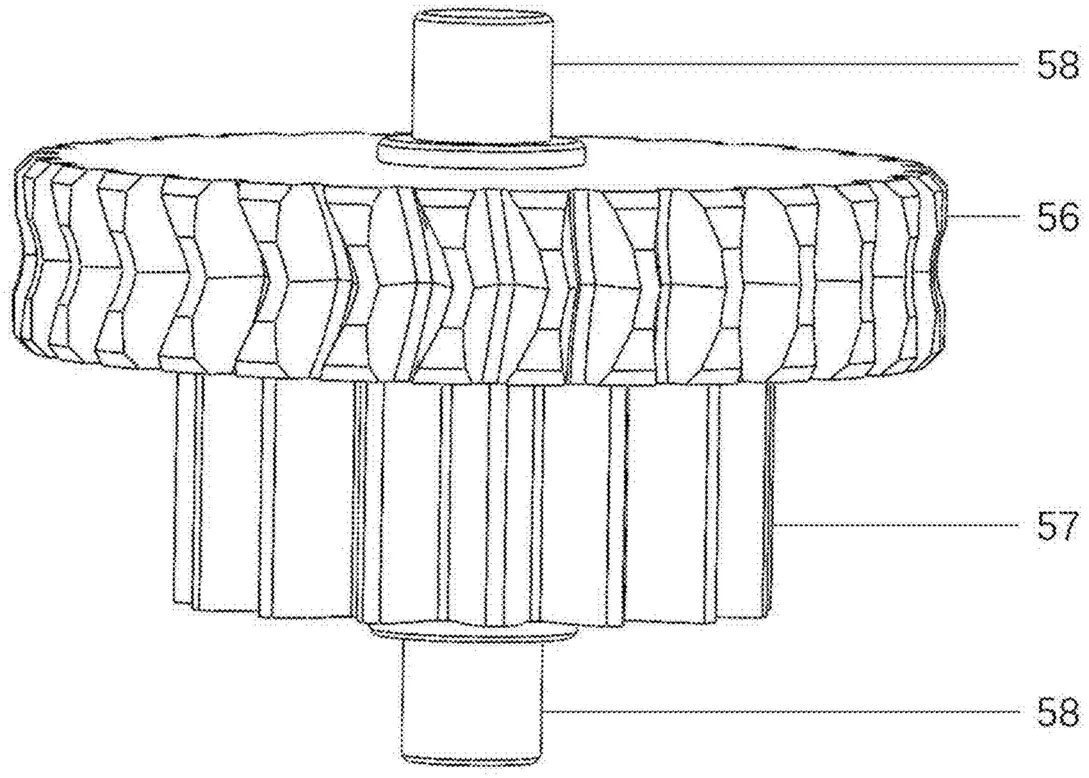
FIG. 19 is a schematic view of a dual gear of the second embodiment.
Figure 20:
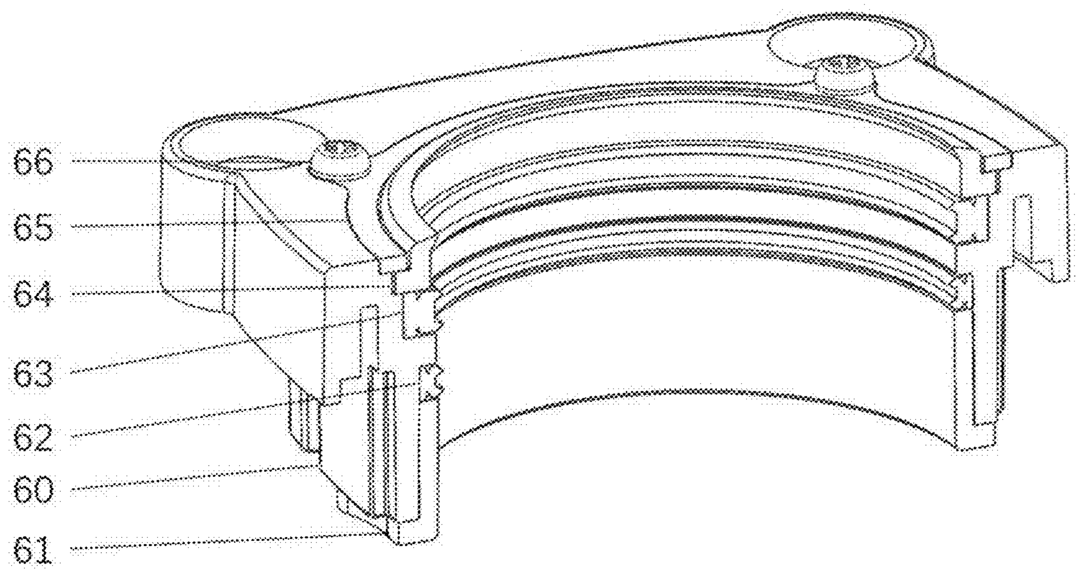
FIG. 20 is a schematic view of a front end cap assembly.
Figure 21:
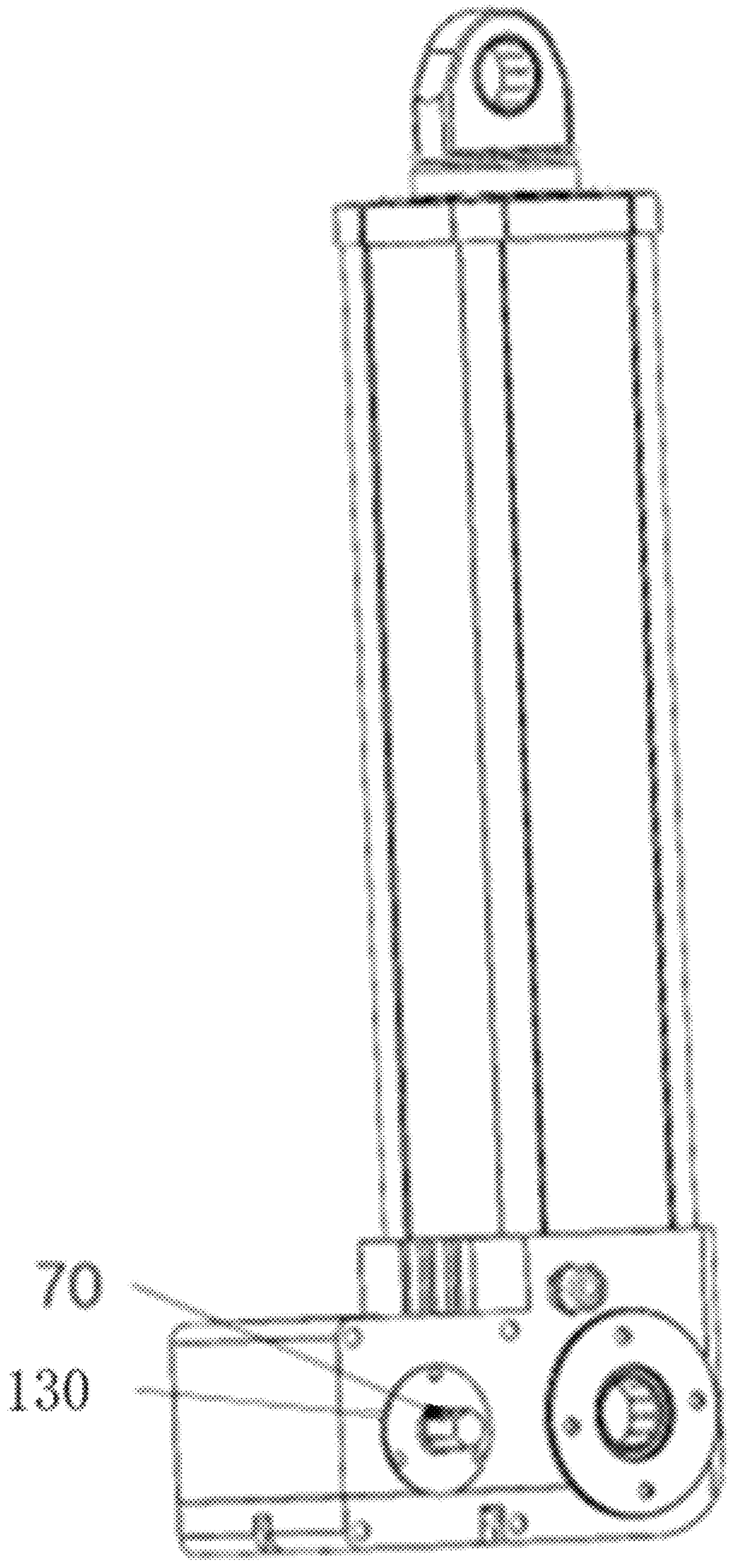
FIG. 21 is a schematic view of a second lifting push rod of the second embodiment.
Figure 22:
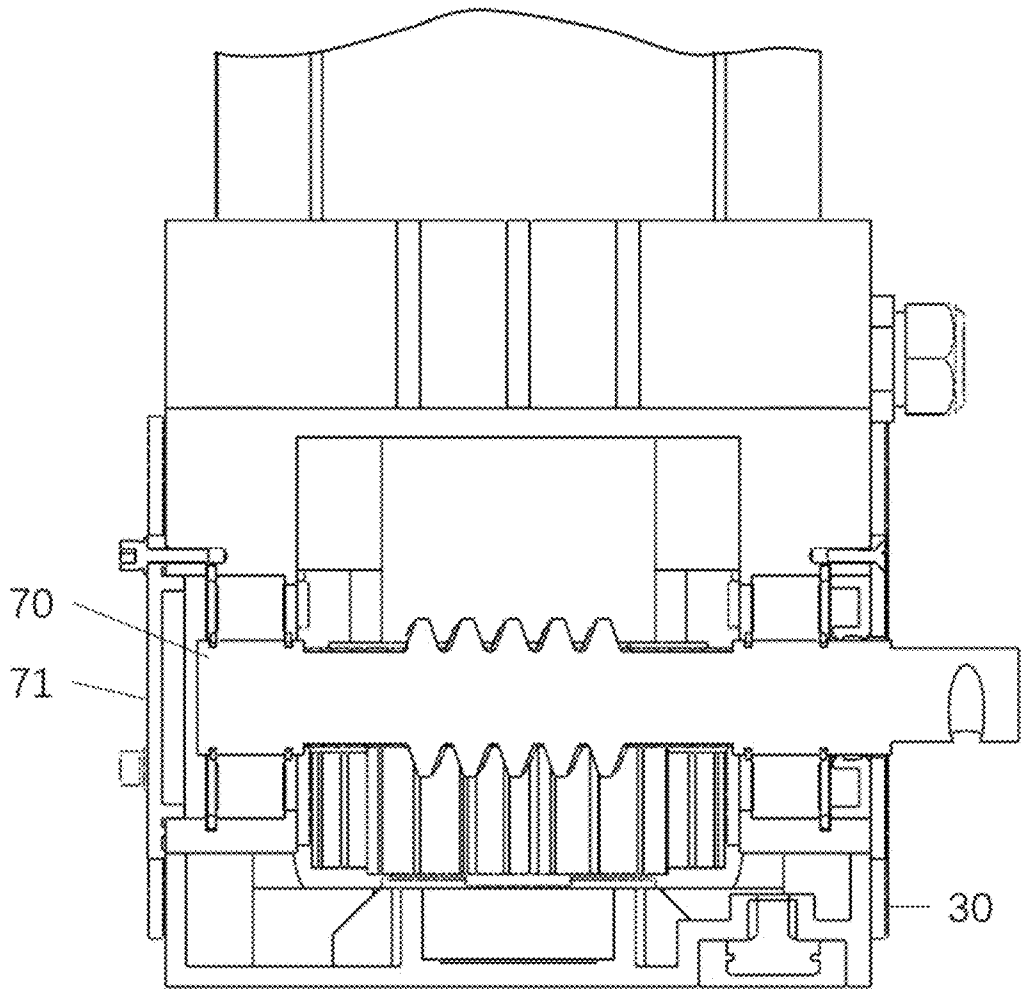
FIG. 22 is a schematic view of an output shaft of the second lifting push rod of the second embodiment.
Figure 23:
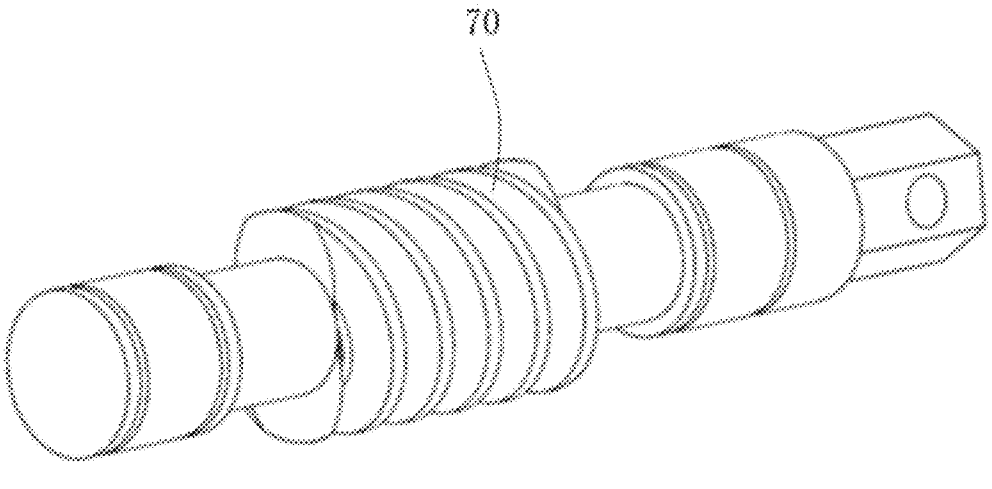
FIG. 23 is a schematic view of an input shaft of the second embodiment.
Figure 24:
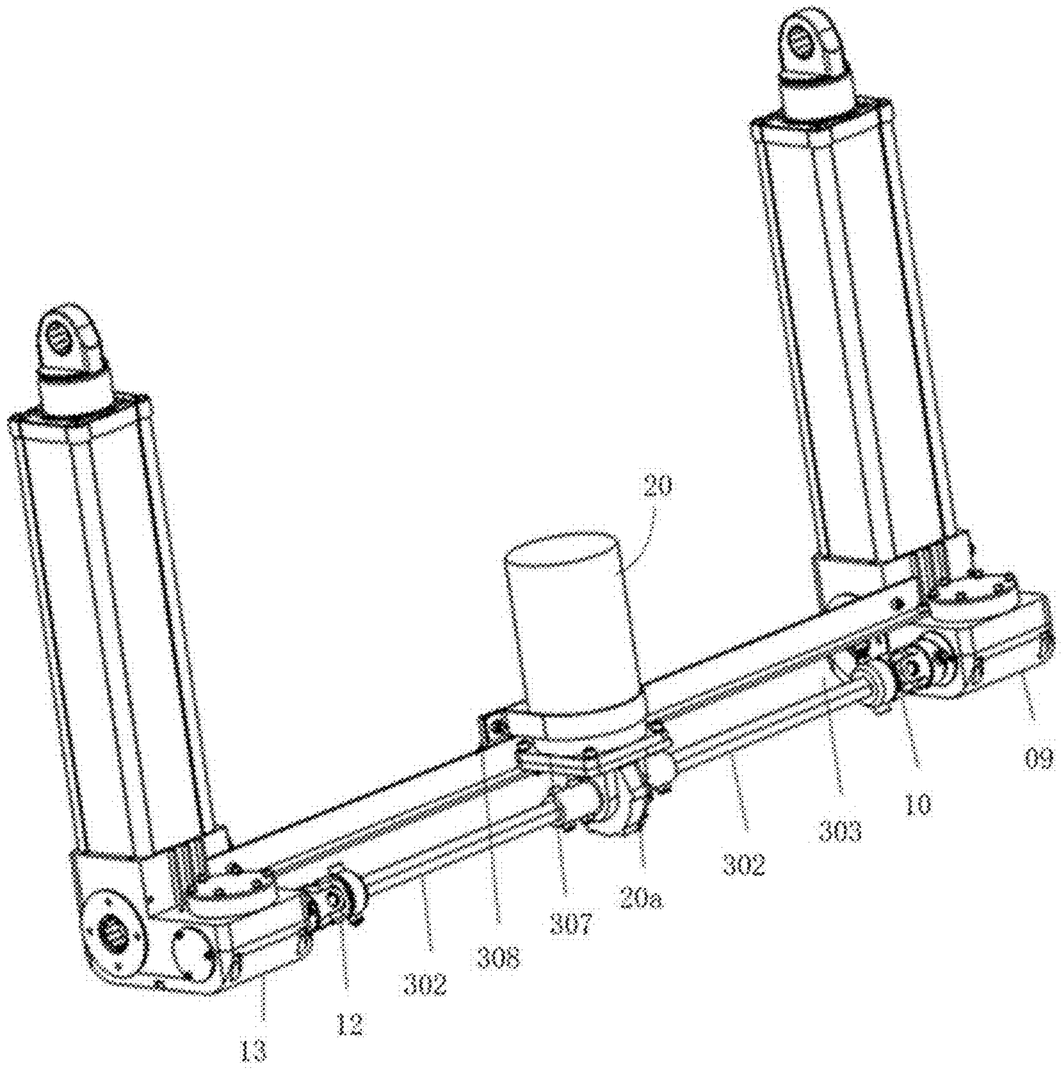
FIG. 24 is a schematic view of a lifting power assembly according to a second embodiment.
Figure 25:
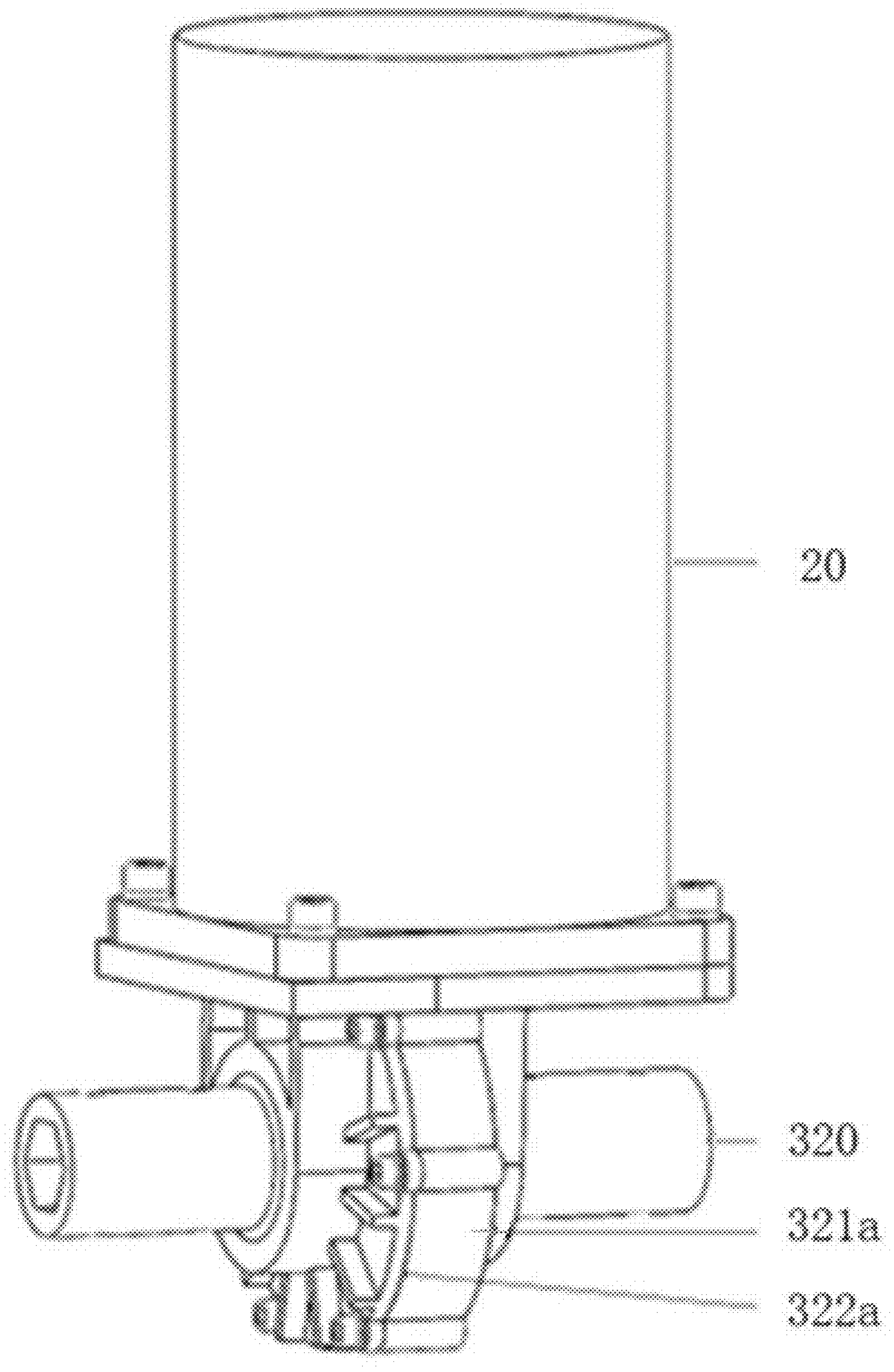
FIG. 25 is a schematic view of a power assembly according to the third embodiment.
Figure 26:
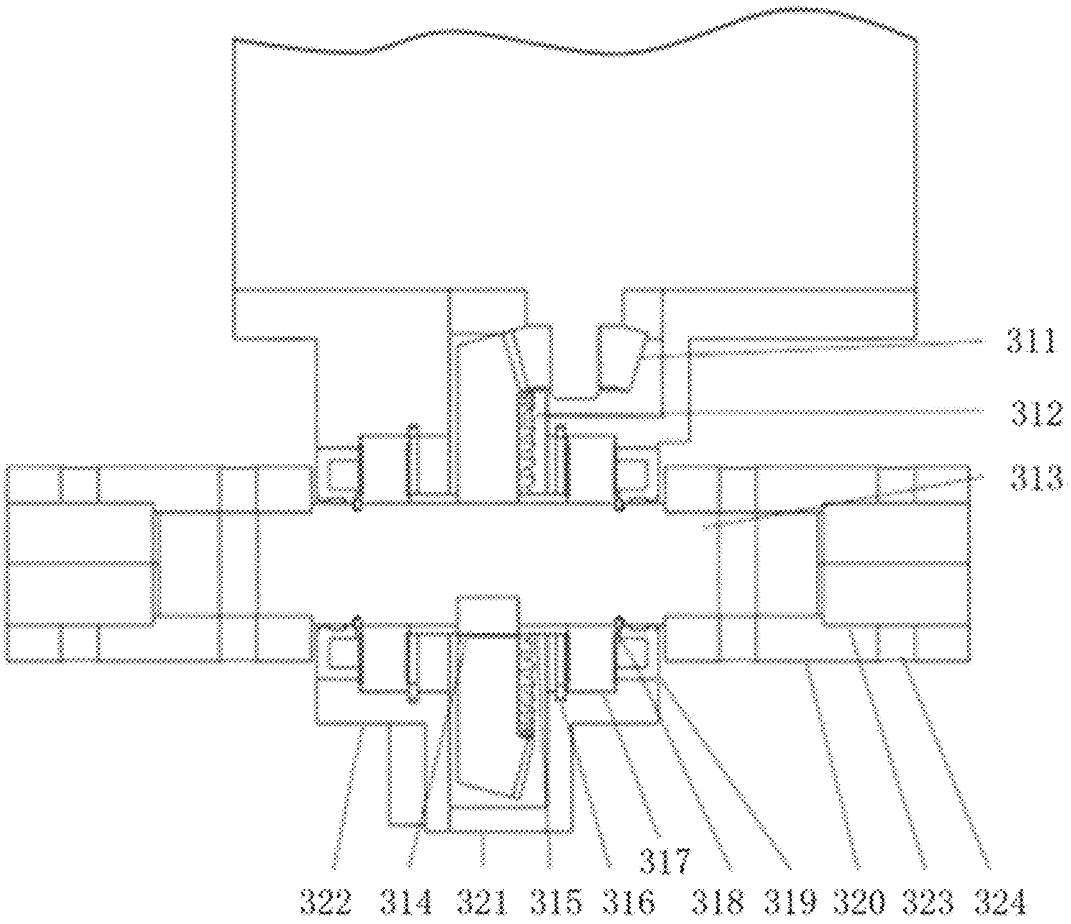
FIG. 26 is a cross-sectional view of the power assembly of the third embodiment.
Figure 27:
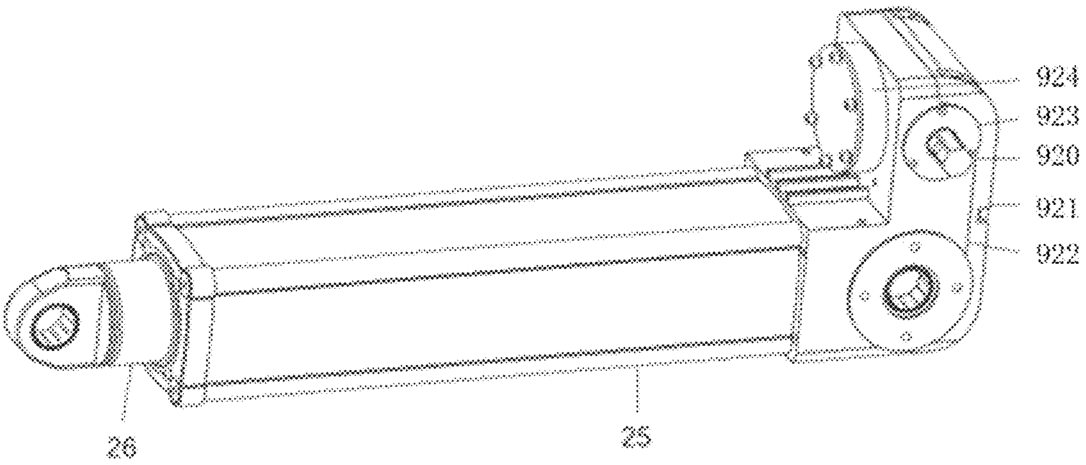
FIG. 27 is a schematic view of a first lifting push rod of the third embodiment.
Figure 28:
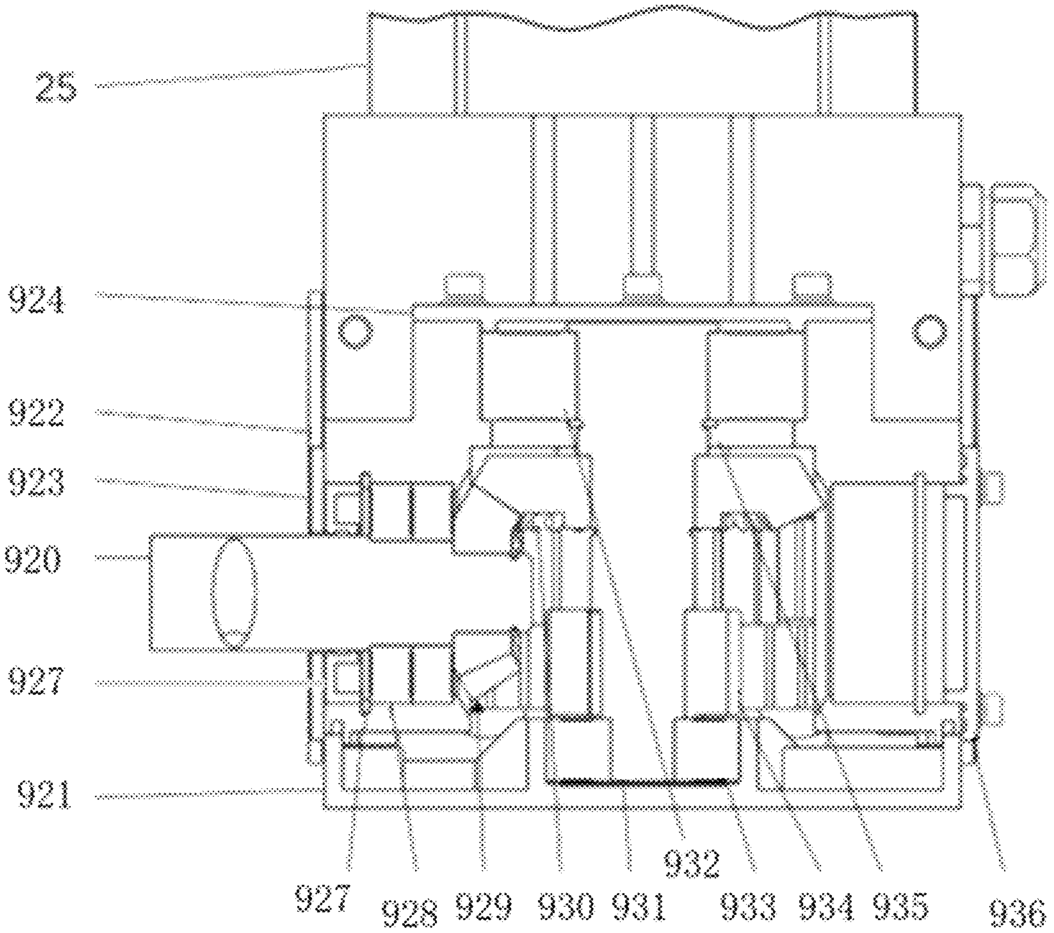
FIG. 28 is a cross-sectional view of the first lifting push rod of FIG. 27.
Figure 29:
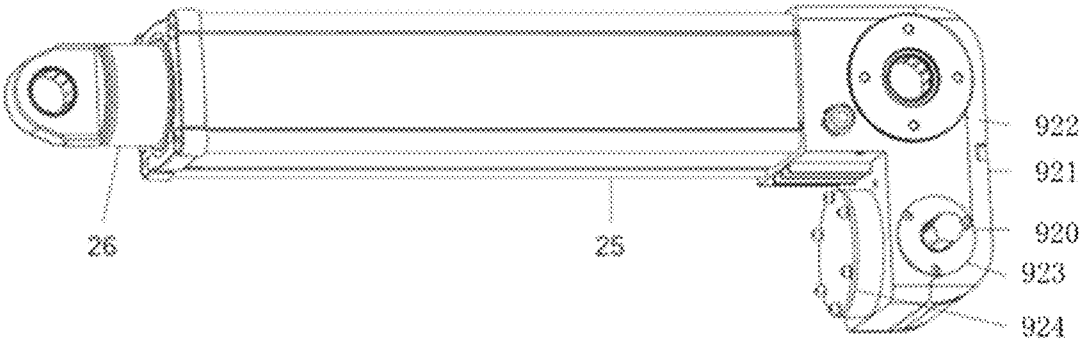
FIG. 29 is a schematic view of a second lifting push rod of the third embodiment.
Figure 30:
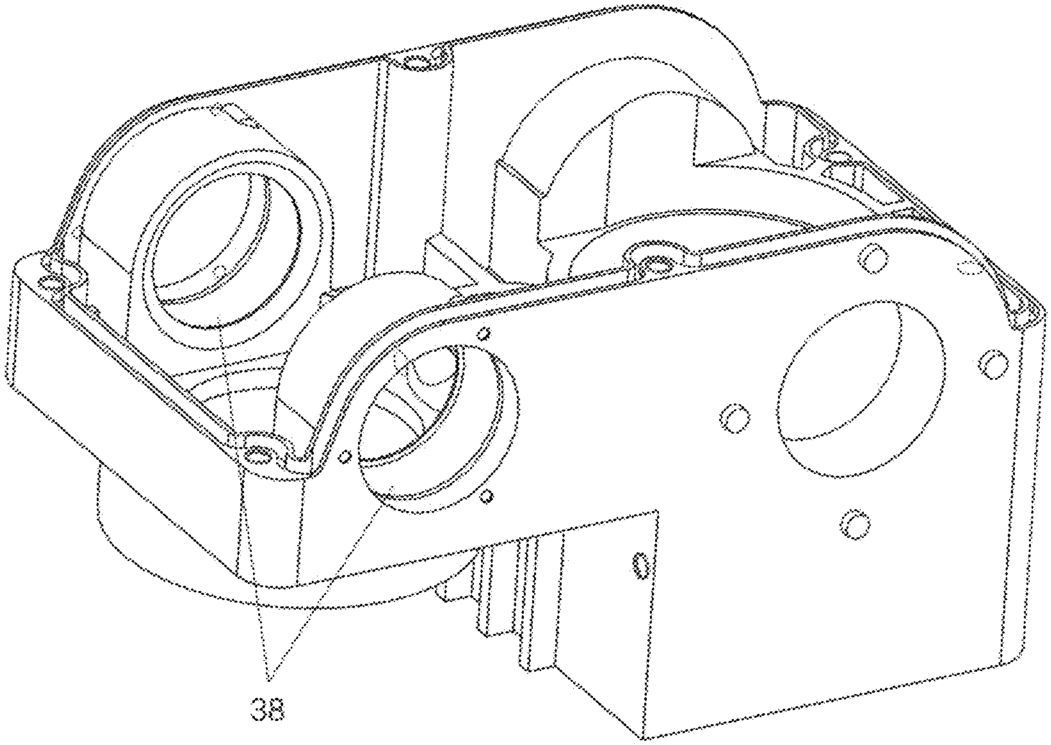
FIG. 30 is a schematic view of a reduction gearbox of the third embodiment.

As shown in FIGS. 10-12, The first universal joint coupler (10) includes: short end (50), long end (51), cross bearing (52), retaining ring (53), bolt (54), and lock nut (55). The second universal joint coupler (12) consists of: two short ends (50), cross bearing (52), retaining ring (53), bolt (54), and lock nut (55).

The output shaft (23) of the first lifting push rod (09) is fixedly connected to the first universal joint coupler (10), which is non-rotatably connected to one end of the connecting shaft (11). The other end of the connecting shaft (11) is fixedly connected to the second universal joint coupler (12), and the second universal joint coupler (12) is fixedly connected to the output shaft (23) of the second lifting push rod (13). Through this arrangement, power is transmitted from the first lifting push rod (09) to the second lifting push rod (13), allowing the two push rods to extend and retract synchronously, providing high synchronization and consistency.

The long end (51) features a hexagonal through hole (56); one end of the connecting shaft (11) is equipped with an elongated hole (60).

Since the long end (51) has a hexagonal through hole (56), and after installation, the remaining length at the right end of the hexagonal through hole (56) is greater than the length of the connecting shaft inserted into the short end, the connecting shaft (11) can first be inserted into the long end (51) to the far right. This allows the other end of the connecting shaft (11) to smoothly enter the short end of the second universal joint coupler (12). The connecting shaft (11) can then be moved leftward, and by using the locking bolt (54) and lock nut (55), the connecting shaft is secured to the universal joint coupler. This design greatly facilitates installation and disassembly.

One end of the connecting shaft (11) has an elongated hole (60), allowing the bolt (54) to move axially within the elongated hole, enabling the connecting shaft (11) to move axially relative to the first universal joint coupler (10). This feature compensates for changes in distance between the first lifting push rod (09) and the second lifting push rod (13) during movement, thus eliminating axial forces within the lifting power assembly.

The electric vehicle tailgate of this embodiment allows for the use of a single motor to simultaneously drive two lifting push rods by connecting the power shafts of the two push rods in series. The motor output shaft first passes through a planetary gearbox for speed reduction before transmitting power to the two push rods, thereby requiring only one set of planetary gear reduction. The shafts of the two push rods are connected by two universal joint couplers, ensuring that the two push rod shafts can smoothly connect and function normally even when there are certain dimensional and installation tolerances in the parts. An elongated end of the coupler is provided, allowing for the installation and disassembly of the coupler and connecting shaft without removing the push rods, through the telescopic sliding of the connecting shaft.

In this embodiment, the output shaft of the motor 20 is axially parallel to the inner tube 26 and outer tube 25 of the first lifting push rod 09. However, the motor 20 can also adopt other transmission layouts. Please refer to FIGS. 13-23. Another embodiment provides a single motor double push rod electric vehicle tailgate system, which is similar to the first embodiment, except that the output shaft 23 of the motor 20 is parallel to the connecting shaft 11. Accordingly, the transmission mechanism inside the first lifting push rod 09 adapted to the motor 20 also needs to be adjusted accordingly.

The single motor double push rod electric vehicle tailgate system of this embodiment includes: first push rod 09, first universal joint coupler 10, connecting shaft 11, second universal joint coupler 12, and second push rod 13.

The first push rod 09 includes: motor 20, gearbox cover 221, gearbox 222, output shaft 23, bottom bushing 214, outer tube 25, front end cap assembly 16, inner tube 26, front joint 27, top bushing 19, dual gear 120, first deep groove ball bearing 211, large gear 220, screw rod 28, second deep groove ball bearing 36, bushing 225, knurled pin 226, angular contact bearing 227, thrust bearing 228, bearing bushing 80, screw rod nut 229, shaft end cover 230, oil seal 231, hole retaining ring 232, shaft retaining ring 233, third deep groove ball bearing 37.

The middle part of the output shaft 23 is provided with a worm thread 50; both ends are symmetrically provided with retaining ring grooves 52 and bearing mounting cylindrical surfaces 52. One end face is provided with a motor shaft hole 53, and the other side has an output end 54 with a round hole 55. The motor shaft hole 53 has a keyway 531 for connecting the motor shaft to transmit torque. The output end 54 can be a polyhedron, such as an external hexagon, to facilitate non-rotatable connection with other components.

The large gear ring of the dual gear 120 is the worm gear teeth 56, and the small gear ring is the gear teeth 57. Both ends have mounting shafts 58.

The main power transmission process of the above single motor double push rod electric vehicle tailgate system is as follows: the motor output shaft is non-rotatably connected with the output shaft, and the motor housing is fixedly connected to the gearbox cover 221 and gearbox 222. The output shaft is rotatably fixed on the gearbox cover 221 through the third deep groove ball bearings 37 at both ends and axially positioned using multiple hole retaining rings 232 and shaft retaining rings 233. The worm thread 50 of the output shaft 23 meshes with the worm gear teeth 56 of the dual gear 120, transmitting power to the dual gear 120. The dual gear 120 is rotatably fixed to the gearbox cover 221 and gearbox 222 through the first deep groove ball bearings 211 on both mounting shafts 58. The gear teeth 57 of the dual gear 120 mesh with the large gear 220, transmitting power to the large gear 220. The large gear 220 is non-rotatably fixed on the screw rod 28, driving the screw rod 28 to rotate. The screw rod 28 is fixed to the gearbox cover 221 and gearbox 222 through the second deep groove ball bearing 36 and angular contact bearing 227. The rotation of the screw rod 28 drives the screw rod nut 229 to perform linear telescopic motion. The inner tube 26 is fixedly connected with the screw rod nut 229, and the front joint 27 is fixedly connected with the inner tube 26. The top bushing 19 is fixed on the front joint 27, and the bottom bushing 214 is fixed on the gearbox 222. Thus, the rotation of the motor can drive the top bushing 19 to perform telescopic motion relative to the bottom bushing 214, thereby driving the vehicle tailgate to perform lifting actions.

When the push rod bears pressure, the pressure is transmitted through the top bushing 19, front joint 27, inner tube 26, screw rod nut 229, screw rod 28, bearing bushing 80, and thrust bearing 228 to the gearbox 221 and bottom bushing 214.

When the push rod bears tension, the tension is transmitted through the top bushing 19, front joint 27, inner tube 26, screw rod nut 229, screw rod 28, knurled pin 226, bushing 225, and angular contact bearing 227 to the gearbox 222 and bottom bushing 214. Since the lifting push rod of the vehicle tailgate mainly bears compressive force, a thrust bearing with high load capacity is used to bear the compressive force. An angular contact bearing 227 with relatively lower load capacity is used to bear the tensile force, which can reduce cost by eliminating the need for an additional thrust bearing. The angular contact bearing 227 can also bear radial forces, initiating the function of fixing the screw rod 28.

The front end cap assembly 16 includes: front end cap 60, anti-sway inner ring 61, inner sealing ring 62, outer sealing ring 63, scraper ring 64, pressure plate 65, and screw 66. The lower part of the front end cap 60 is inserted into the outer tube 25, fitting with the outer tube 25. The anti-sway inner ring 61 is located between the inner tube 26 and the front end cap 60, initiating the function of preventing the inner tube 26 from wobbling. The inner sealing ring 62 and outer sealing ring 63 are installed on the front end cap 60; the inner ring contacts the inner tube 26 to provide dustproof and waterproof functions. The inner sealing ring 62 is located at the top of the anti-sway inner ring 61. The outer sealing ring 63 is locked and compressed by the scraper ring 64, which is locked and compressed by the pressure plate 65. The pressure plate 65 is fixed on the front end cap 60 through screws 66. The scraper ring 64 has a sharp edge at the top, which can scrape off solid substances attached to the inner tube, protecting the sealing ring and ensuring sealing reliability.

The second push rod 13 is structurally similar to the first push rod 09, but it is not equipped with a motor and has no output shaft; instead, it has an input shaft 70. The installation of the shaft end cover 130 is switched from one side to the other, and a sealing cover 71 is installed at the position where the shaft end cover 130 was originally installed.

The input shaft 70 is structurally similar to the output shaft 23, but it is not provided with a motor shaft hole, and the other end of the external hexagonal output end is shorter than that of the output shaft.

The single motor double push rod electric vehicle tailgate system of this embodiment can further reduce the number of bearings used, simplify the installation structure, and improve the reliability and service life of the tailgate.

Furthermore, the motor 20 is not limited to being installed on the first push rod 09 or the second push rod 13. Refer to FIGS. 24-30. Another embodiment provides a single motor double push rod electric vehicle tailgate system, which is similar to the system shown in FIG. 1, except that the motor 20 is installed between the first push rod 09 and the second push rod 13.

The single motor double push rod electric vehicle tailgate system provided in this embodiment includes: power assembly 20*a*, rotating shaft 302, mounting frame 303, first coupler 10, second coupler 12, first push rod 09, second push rod 13, mounting coordinates 307, and connecting plate 308.

The power assembly 20*a* includes motor 20, small bevel gear 311, large bevel gear 312, output shaft 313, connecting key 314, shaft sleeve 315, hole retaining ring 316, deep groove ball bearing 317, shaft retaining ring 318, oil seal 319, connecting sleeve 320, chassis 321, and box cover 322.

The motor 20 is fixedly installed on an install sit 307, which is fixed on a connecting plate 308. A first end of the connecting plate 308 is fixed to the first lifting push rod 09 and a second end of the connecting plate 308 is fixed to the second lifting push rod 13. The motor 20 is also fixedly connected to the chassis 321 and box cover 322. The small bevel gear 311 is fixedly connected to the motor shaft. The small bevel gear 311 meshes with the large bevel gear 312, and the tooth count of the large bevel gear 312 is significantly greater than that of the small bevel gear 311. The large bevel gear 312 is non-rotatably connected to the shaft sleeve 315 through the connecting key 314. Shaft sleeves 315 are arranged on both sides of the large bevel gear 312 to limit its axial displacement. The hole retaining ring 316 is snapped onto the chassis or box cover, fixing the deep groove ball bearing 317 on the chassis or box cover. The shaft retaining rings 318 are snapped onto the output shaft 313. The two shaft retaining rings 318 clamp the two deep groove ball bearings 317 in the middle, and tighten the large bevel gear 312 and shaft sleeve 315, so that the large bevel gear 312 and output shaft 313 are axially fixed on the deep groove ball bearings 317, thereby being rotatably fixed to the chassis 321 and box cover 322. An oil seal 319 is arranged on the outer side of the deep groove ball bearing 317, and the oil seal 319 is located between the output shaft 313, chassis 321, and box cover 322, serving a sealing function. The output shaft 313 is fixedly connected at both ends with connecting sleeves 320, and the outer side of the connecting sleeve is provided with a hexagonal hole 323 and a round hole 324.

The first push rod 09 includes: input shaft 920, reduction gearbox cover 921, reduction gearbox 922, oil seal baffle 923, end cover 924, outer tube 25, inner tube 26, second hole retaining ring 927, second deep groove ball bearing 928, input bevel gear 929, transmission bevel gear 930, transmission shaft 931, third deep groove ball bearing 932, fourth deep groove ball bearing 933, transmission gear 934, second shaft retaining ring 935, and blind cover 936.

The input shaft 920 is fixedly connected with the input bevel gear 929. The input shaft 920 is rotatably fixed to the reduction gearbox 922 through the second deep groove ball bearing 928. The input bevel gear 929 meshes with the transmission bevel gear 930. The transmission bevel gear 930 and transmission gear 934 are fixedly connected with the transmission shaft 931. The transmission shaft is rotatably fixed to the reduction gearbox cover 921 and reduction gearbox 922 through the third deep groove ball bearing 932 and fourth deep groove ball bearing 933. The transmission gear 934 transmits power to the screw rod of the first push rod 09 through multiple sets of gear transmissions and reductions, and drives the inner tube 26 to perform telescopic motion through the screw rod.

The structure of the second push rod 13 can be symmetrical with that of the first push rod 09. The input shaft and related components of the second push rod 13 are arranged on the other side, and other structures are the same.

The reduction gearbox 922 is symmetrically provided with input shaft mounting holes 38 on both sides, which can be adapted to both the first push rod 09 and the second push rod 13 by simply changing the installation positions of the related components.

The connecting sleeve 320 of the power assembly 20*a* is fixedly connected with the rotating shaft 302. The rotating shaft 302 is connected to the input shafts 920 of the first push rod 09 and the second push rod 13 through the first coupler 10 and second coupler 13, respectively, thereby transmitting power to the first push rod 09 and the second push rod 13 to control their extension and retraction.

Both ends of the mounting frame 303 are fixed to the reduction gearbox 922 of the first push rod 09 and the second push rod 13. The motor 20, chassis 321, and box cover 322 of the power assembly 20*a* are fixedly connected to the mounting frame 303, ensuring that the housing part of the power assembly 20*a* always keeps up with the synchronous movement of the push rods, while ensuring that the rotating shaft 302 only transmits torque without bearing other forces.

The single motor double push rod electric vehicle tailgate system of this embodiment sets the power assembly 20*a* between the first push rod 09 and the second push rod 13, more precisely, at a position between the first push rod 09 and the second push rod 13. This arrangement makes the mass distribution of the tailgate more uniform, reduces the pressure borne between components, and enhances the service life of mechanisms such as bearings.

The present invention relates to a single motor-driven double push rod electric vehicle tailgate system designed to efficiently open and close a vehicle's tailgate with enhanced synchronization and reduced mechanical complexity. The system comprises a beam assembly fixed on the vehicle, a follow-up plate, a lifting arm, and a lifting power assembly.

The lifting power assembly includes a motor, a first lifting push rod, a second lifting push rod, and a transmission mechanism coupled to the motor. The top end of the follow-up plate is hinged to the beam assembly, while its middle portion is hinged to the lower end of the lifting arm. The bottom end of the follow-up plate is hinged to the bottom end of either the first or second lifting push rod. The retractable end of the first or second lifting push rod is hinged to the middle-lower end of the lifting arm. This configuration allows the lifting arm to move in a controlled manner, enabling the tailgate to open or close smoothly.

In one embodiment, the motor is fixed on the first lifting push rod, which includes a first output shaft coupled to the motor. The transmission mechanism comprises a connecting shaft, where one end is connected to the first output shaft and the other end is connected to a second output shaft on the second lifting push rod. This arrangement ensures that both lifting push rods extend and retract synchronously, providing high synchronization and consistency in the tailgate's movement.

The transmission mechanism further includes first and second universal joint couplers connected between the lifting push rods and the connecting shaft. The first universal joint coupler features a long end with a hexagonal through-hole, and the connecting shaft has an elongated hole at one end. This design allows for angular misalignment and axial movement of the connecting shaft relative to the universal joint coupler, compensating for distance changes between the lifting push rods during operation. It also facilitates installation and disassembly without the need to remove the push rods.

Each lifting push rod comprises an outer tube and an inner tube configured for telescopic movement. A ball screw mechanism converts rotational motion into linear motion, enabling the inner tube to extend or retract relative to the outer tube. The transmission gearbox within each push rod includes a driving bevel gear connected to the motor, an output bevel gear meshing with the driving bevel gear, and a gear train comprising a high-speed gear, a dual transmission gear, and a low-speed gear. This gear train provides speed reduction between the motor and the ball screw mechanism.

The push rods also feature a front end cap assembly that includes a front end cap fitted into the outer tube, an anti-sway inner ring located between the inner and outer tubes to prevent wobbling, and inner and outer sealing rings for dustproof and waterproof sealing. A scraper ring and pressure plate secure the sealing rings and scrape off solid substances from the inner tube during operation, enhancing the durability and reliability of the system.

To prevent unintended movement of the tailgate when the power is turned off, the motor is equipped with a brake that locks the motor shaft. Additionally, the system employs a thrust bearing configured to bear compressive forces during tailgate lifting and an angular contact bearing to bear tensile and radial forces. This arrangement enhances reliability and reduces the need for additional thrust bearings.

In another embodiment, the motor is fixedly installed between the first and second lifting push rods. The transmission mechanism includes first and second connecting shafts, where each is coupled to opposite sides of the motor and connected to input shafts on the respective lifting push rods. This configuration ensures synchronous extension and retraction of the lifting push rods while optimizing space and mechanical efficiency.

The motor in this embodiment includes a small bevel gear fixedly connected to its shaft, which meshes with a large bevel gear non-rotatably connected to a rotating shaft. The rotating shaft is rotatably fixed to a chassis and a box cover, transmitting power to the lifting push rods without bearing axial forces. The lifting power assembly also includes a mounting frame fixed to both lifting push rods, ensuring that the motor housing moves synchronously with the push rods during operation.

By utilizing a single motor to drive both lifting push rods, the system reduces mechanical complexity and manufacturing costs while improving synchronization and consistency in tailgate movement. The structural symmetry of the lifting push rods simplifies manufacturing and assembly, as adjustments can be made by changing only the installation positions of related components.

The tailgate system may further include a door closing push rod hinged to a fixed beam and a load platform. This push rod assists in closing the tailgate by pushing the load platform toward a closed position, enhancing the overall functionality of the system.

This innovative tailgate system offers a reliable, efficient, and cost-effective solution for electric vehicle tailgate operations, providing enhanced user experience and mechanical performance.

What is claimed is:

1. A single motor-driven double push rod electric vehicle tailgate system, comprising:

a beam assembly, configured for being fixed on an automobile;

a follow-up plate;

a lifting arm; and a lifting power assembly comprising a first lifting push rod, a second lifting push rod, a motor, and a transmission mechanism coupled to the motor;

wherein a top end of the follow-up plate is hinged to the beam assembly, a middle of the follow-up plate is hinged to a lower end of the lifting arm, and a bottom end of the follow-up plate is hinged to a bottom end of either the first lifting push rod and the second lifting push rod;

a retractable end of the first lifting push rod or the second lifting push rod is hinged to the middle-lower end of the lifting arm;

the transmission mechanism comprises at least one connecting shaft rotatably coupled to the motor, enabling the first lifting push rod and the second lifting push rod retractable along a certain direction thereby driving the lifting arm moving to open or close the tailgate.

2. The single motor-driven double push rod electric vehicle tailgate system of claim 1, wherein the motor is fixed on the first lifting push rod, a first output shaft is provided on the first lifting push rod, the first output shaft is coupled to the motor, the transmission mechanism comprises a first connecting shaft, a first end of the first connecting shaft is connected to the output shaft and a second end of the first connecting shaft is connected to a second output shaft provided on the second lifting push rod thereby driving the second lifting push rod to extend and retract synchronously.

3. The single motor-driven double push rod electric vehicle tailgate system of claim 2, wherein an output shaft of the motor is axially parallel to the extending or retracting direction of the first lifting push rod or the second lifting push rod.

4. The single motor-driven double push rod electric vehicle tailgate system of claim 1, wherein the lifting power assembly further comprises a first universal joint coupler connected between the first lifting push rod and the connecting shaft, and a second universal joint coupler connected between the connecting shaft and the second lifting push rod, allowing for angular misalignment and facilitating installation and disassembly.

5. The single motor-driven double push rod electric vehicle tailgate system of claim 4, wherein the first universal joint coupler includes a long end with a hexagonal through hole, and the connecting shaft has an elongated hole at one end, enabling axial movement of the connecting shaft relative to the first universal joint coupler to compensate for distance changes between the first and second lifting push rods during operation.

6. The single motor-driven double push rod electric vehicle tailgate system of claim 1, wherein each of the first and second lifting push rods comprises:

an outer tube and an inner tube configured for telescopic movement;

a ball screw mechanism that converts rotational motion into linear motion to extend or retract the inner tube relative to the outer tube;

a transmission gearbox that transmits power from the motor to the ball screw mechanism.

7. The single motor-driven double push rod electric vehicle tailgate system of claim 6, wherein the transmission gearbox includes:

a driving bevel gear connected to the motor;

an output bevel gear meshing with the driving bevel gear;

a gear train comprising a high-speed gear, a dual transmission gear, and a low-speed gear, providing speed reduction between the motor and the ball screw mechanism.

8. The single motor-driven double push rod electric vehicle tailgate system of claim 7, wherein the lifting push rods further include a front end cap assembly comprising:

a front end cap fitted into the outer tube;

an anti-sway inner ring located between the inner tube and the front end cap to prevent wobbling;

inner and outer sealing rings installed on the front end cap for dustproof and waterproof sealing;

a scraper ring and a pressure plate securing the sealing rings and scraping off solid substances from the inner tube during operation.

9. The single motor-driven double push rod electric vehicle tailgate system of claim 7, wherein each lifting push rod includes:

a thrust bearing configured to bear compressive forces during tailgate lifting;

an angular contact bearing configured to bear tensile and radial forces, thereby enhancing reliability and reducing the need for additional thrust bearings.

10. The single motor-driven double push rod electric vehicle tailgate system of claim 1, wherein the motor is equipped with a brake that locks the motor shaft when power is turned off, preventing unintended movement of the tailgate.

11. The single motor-driven double push rod electric vehicle tailgate system of claim 1, wherein the lifting power assembly further comprises a planetary gearbox coupled to the motor, providing initial speed reduction before transmitting power to the lifting push rods.

12. The single motor-driven double push rod electric vehicle tailgate system of claim 11, wherein the planetary gearbox includes:

a planetary input shaft connected to the motor shaft;

a planetary output shaft connected to the transmission gearbox;

at least one deep groove ball bearing supporting the planetary output shaft for smooth rotation.

13. The single motor-driven double push rod electric vehicle tailgate system of claim 1, wherein the transmission mechanism includes a gear reduction mechanism comprising bevel gears and a gear train, transmitting torque from the motor to the lifting push rods with reduced speed and increased torque.

14. The single motor-driven double push rod electric vehicle tailgate system of claim 1, wherein the motor is fixedly installed between the first lifting push rod and the second lifting push rod, the at least one connecting shaft comprises a first connecting shaft and a second connecting shaft, a first end of the first connecting shaft is coupled to a first side the motor and a second end of the first connecting shaft is coupled to an input shaft provided on the first lifting push rod, a first end of the second connecting shaft is coupled to a second side of the motor and a second end of the second connecting shaft is coupled to an input shaft provide on the second lifting push rod thereby driving the second lifting push rod to extend and retract synchronously.

15. The single motor-driven double push rod electric vehicle tailgate system of claim 14, wherein the motor is installed between the first and second lifting push rods, and the transmission mechanism includes:

a rotating shaft connected to both the first and second lifting push rods via respective input shafts and couplers, ensuring synchronous extension and retraction of the lifting push rods.

16. The single motor-driven double push rod electric vehicle tailgate system of claim 15, wherein:

the motor includes a small bevel gear fixedly connected to its shaft;

the small bevel gear meshes with a large bevel gear non-rotatably connected to the rotating shaft;

the rotating shaft is rotatably fixed to a chassis and a box cover, transmitting power to the lifting push rods without bearing axial forces.

17. The single motor-driven double push rod electric vehicle tailgate system of claim 1, wherein:

the lifting power assembly includes a mounting frame fixed to the first and second lifting push rods;

the motor is fixedly connected to the mounting frame, ensuring that the motor housing moves synchronously with the lifting push rods during operation.

18. The single motor-driven double push rod electric vehicle tailgate system of claim 1, wherein the motor output shaft is parallel to the connecting shaft connecting the first and second lifting push rods, optimizing space and mechanical efficiency.

19. The single motor-driven double push rod electric vehicle tailgate system of claim 1, wherein the first and second lifting push rods are structurally symmetrical, allowing for simplified manufacturing and assembly by changing only the installation positions of related components.

20. The single motor-driven double push rod electric vehicle tailgate system of claim 1, further comprising:

a door closing push rod hinged to a fixed beam and to a load platform, configured to assist in closing the tailgate by pushing the load platform towards a closed position.

* * * * *